US009734351B2

(12) United States Patent
Hermann

(10) Patent No.: US 9,734,351 B2
(45) Date of Patent: *Aug. 15, 2017

(54) ELECTRONIC SIGNATURE FOR AND ELECTRONIC SYSTEM AND METHOD FOR EMPLOYMENT ELIGIBILITY VERIFICATION

(75) Inventor: John Michael Hermann, Newport Coast, CA (US)

(73) Assignee: FORM I-9 COMPLIANCE, LLC, Tampa, FL (US)

( * ) Notice: Subject to any disclaimer, the term of this patent is extended or adjusted under 35 U.S.C. 154(b) by 835 days.

This patent is subject to a terminal disclaimer.

(21) Appl. No.: 11/775,351

(22) Filed: Jul. 10, 2007

(65) Prior Publication Data
US 2008/0015883 A1 Jan. 17, 2008

Related U.S. Application Data

(63) Continuation of application No. 11/234,372, filed on Sep. 26, 2005.
(Continued)

(51) Int. Cl.
*G06Q 10/10* (2012.01)
*G06Q 10/00* (2012.01)
(Continued)

(52) U.S. Cl.
CPC ......... *G06F 21/6245* (2013.01); *G06Q 10/10* (2013.01); *G06Q 10/105* (2013.01); *G06Q 10/1053* (2013.01); *G06Q 30/018* (2013.01)

(58) Field of Classification Search
CPC .......................... G06Q 10/1053; G06Q 10/105
(Continued)

(56) References Cited

U.S. PATENT DOCUMENTS 6,192,381 B1 * 2/2001 Stiegemeier et al. ........ 715/210
6,959,382 B1 * 10/2005 Kinnis et al. ................. 713/170
(Continued)

OTHER PUBLICATIONS

USCIS (United States Citizenship and Immigration Services Website, uscis.gov, pp. 1-39). (1991).*

*Primary Examiner* — Jonathan Ouellette
(74) *Attorney, Agent, or Firm* — Stephen E. Kelly; Hill Ward Henderson, P.A.

(57) ABSTRACT

A computer system and method is disclosed for paperless Form I-9 processing, and for automating employment eligibility verification. The system and method displays a series of screens with fillable fields configured to receive immigration information. After substantial completion of the fillable fields by a user, the system displays an affirmation screen with affirmation language necessary to meet a statutory requirement for a valid electronic signature and an interface element affirming such language. Only after the interface element has been actuated is a file containing the completed fillable fields marked with an indication that the file has been electronically signed. The employment eligibility verification aspects disclosed utilize a database and server architecture to receive information provided on an electronic I-9 or other electronic employment eligibility form and perform computerized employment eligibility verification queries with the Federal Government. Scanned documents such as paper I-9s may be uploaded, indexed, tracked, and otherwise processed.

25 Claims, 40 Drawing Sheets

Related U.S. Application Data

(60) Provisional application No. 60/612,610, filed on Sep. 24, 2004.

(51) Int. Cl.
*G06Q 10/08* (2012.01)
*G06Q 30/02* (2012.01)
*G06Q 30/08* (2012.01)
*G06F 21/62* (2013.01)
*G06Q 30/00* (2012.01)

(58) Field of Classification Search
USPC .................................. 705/1, 1.1–912; 726/2
See application file for complete search history.

(56) References Cited

U.S. PATENT DOCUMENTS

| | | | |
|---|---|---|---|
| 2003/0046287 A1* | 3/2003 | Joe ................................. | 707/10 |
| 2004/0148192 A1* | 7/2004 | Morley et al. .................... | 705/1 |
| 2004/0186852 A1* | 9/2004 | Rosen ......................... | 707/104.1 |
| 2004/0216039 A1* | 10/2004 | Lane ....................... | G06F 17/24 |
| | | | 715/229 |

* cited by examiner

FIG. 2

Employee Information and Verification. From Section 1 of Form I-9.

| Last Name | First Name | Mid Init | Maiden Name |
|---|---|---|---|
| | | | |

| Address | | Apt # | Date of Birth |
|---|---|---|---|
| | | | |

| City | State | Zip Code | SSN |
|---|---|---|---|
| | | | |

Hire Date: [ ]

Employer Information and Verification
Completed from Section 2 of Form I-9. Examine one document from List as listed and record the title, number and expiration date, if any, of the document(s)

Document title: Unexpired or Expired U.S. Pas ▼
Issuing Authority: [ ]
Document #: [ ]
Expiration Date: [ ]

Citizenship:
⦿ A Citizen or U.S. National
○ A Lawful Permanent Resident
○ An Alien authorized to work

[ Process Form I9 ]    [ Clear Input ]

Pending Electronic I-9 Forms

Find by Last Name or SSN: [ ] [Search] [Clear Search]

Click on Name, SSN, Hire Date or Enter Date to sort columns below

| Name | Status | SSN | Enter Date ▼ |
|---|---|---|---|
| Doe, John | FI9 Printed EVP Valid | -5504 | 9/20/2005 |
| Doe, John | FI9 Printed EVP Valid | -5502 | 9/20/2005 |
| Doe, John | FI9 Printed EVP Valid | -5504 | 9/20/2005 |
| Flagstone, Sharif | FI9 Printed EVP Valid | -5504 | 9/19/2005 |
| Hirai, George | FI9 Printed EVP Valid | -5504 | 9/19/2005 |
| Doe, John | FI9 Printed EVP Valid | -5504 | 9/15/2005 |
| Barstow, William | FI9 Printed EVP Valid | -5504 | 9/14/2005 |
| Barstow, William | FI9 Printed EVP Valid | -5504 | 9/14/2005 |
| Donn, Danny | FI9 Printed EVP Valid | -5504 | 9/14/2005 |
| Donn, Danny | FI9 Printed EVP Valid | -5504 | 9/14/2005 |
| Donn, Don | FI9 Printed EVP Valid | -5502 | 9/14/2005 |

95 Reports in 8 page(s)    Display [12] Reports per Page [Go]

Page [1] of 8 [Go]    ◁ Previous | Next ▷

[Display All]

FIG. 13

Archived Electronic I-9 Forms

Find by Last Name or SSN: [　　] [Search] [Clear Search]

Click on *Name*, *SSN*, *Hire Date* or *Enter Date* to sort columns below

| Name | SSN | Enter Date ▼ |
|---|---|---|
| Lawson, Jim | -5504 | 9/19/2005 |
| James, Rick | -5504 | 9/19/2005 |
| Nomoredups, Test | -6789 | 9/14/2005 |
| Test, Test | -6789 | 9/14/2005 |
| Test, Test | -6789 | 9/14/2005 |
| Onemoretest, Test | -6789 | 9/14/2005 |
| Onemoretest, Test | -6789 | 9/14/2005 |
| Test, Test | -6789 | 9/14/2005 |
| Test, Test | -6789 | 9/14/2005 |
| Barstow, William | -5502 | 9/13/2005 |
| Dorn, Tony | -5502 | 9/13/2005 |
| Dorn, Tony | -5502 | 9/13/2005 |

42 Reports in 4 page(s)    Display [12] Reports per Page [Go]

Page [1] of 4 [Go]    ◁ Previous | Next ▷

Display All

IF EMPLOYEE CONTESTS THE NON CONFIRMATION, EMPLOYER MUST PRINT SSA REFERRAL LETTER FOR EMPLOYEE AND EMPLOYEE MUST PRESENT LETTER TO THE LOCAL SSA OFFICE FOR THEM TO RESOLVE

ONCE EMPLOYEE HAS VISITED SSA OFFICE AND THE ISSUE HAS BEEN RESOLVED, THE EMPLOYER MAY "VERIFY UPDATED INFORMATION" AND SUBMIT THE "FINAL SSA REQUEST" FOR FINAL CASE RESOLUTION

You are about to create an electronic Signature on File that will be used to complete a Section of a Form I-9. If you need to refer to the Instructions for the form when completing any such Form I-9, click the "View Instructions" button on the website. If you do not consent, you will then have to sign on paper. You can request a paper version of the Form I-9 and Instructions from your employer and they will provide the copy free of charge. If you click the "I Consent" button below, your consent will apply to all Form I-9s that you electronically complete in the future for this particular employer. After you create your electronic Signature on File, any time that you are asked to electronically sign a Form I-9 in this system you may withdraw your consent by entering your username and password and clicking the "Withdraw Consent" button on the e-signature window. You will then have to sign on paper. You may update your Signature on File Record by entering your Username and Password and clicking "Manage Signature On File." If you want a paper copy of the Instructions, you can request it from your employer and they will provide a copy free of charge. Using a computer with an Internet connection, Internet Explorer and Adobe Acrobat reader, you may also access or retain the Instructions at www.formsI9.com By selecting the "I Consent" button below, I acknowledge, agree and attest that (1) I freely consent to viewing the Instructions electronically for all Form I-9s that I complete for this particular employer, (2) each time that I enter my username and password and click "Signature on File" (3) I will have reviewed and confirmed that the information in the Section and signature block referenced above is true and correct, (4) I am the person named in that Section of the document, (5) I freely intend to create and I will be creating my signature on the electronic document as a legally binding electronic signature that carries the same legal effect and enforceability as my handwritten signature; and (6) I understand that I may refuse to sign this document electronically by selecting the "Withdraw Consent" button below, but instead I have freely elected to sign electronically. I understand that if I do not agree with each of (1) through (6), I will select the "Withdraw Consent" button below, in which case, the employer will provide me with a paper Form I-9 and Instructions.

Login Information:

Username: [_____]
It is recommended to your use email address to ensure uniqueness. If you do not, the user name you select may already be in use.

Password: [_____]

Verify Password: [_____]

Email: [_____]  ☐ Send Emails with new signature requests.

Contact Information:

First Name: [_____]
Last Name: [_____]
Middle Initial: [__]

☐ Make Signature on File available for current and future use: (Check to accept; leave blank to reject).
Note: unchecking this box will deactivate Signature on File; however, this will not cause any of your previous electronic signatures to become invalid.

Please select your secret question and type in your answer.

Secret Question: [None ▼]
Answer to your Secret Question: [_____]

[Consent]  [I Do Not Consent]

ELECTRONIC SIGNATURE FOR AND ELECTRONIC SYSTEM AND METHOD FOR EMPLOYMENT ELIGIBILITY VERIFICATION

This application is a Continuation-In-Part of U.S. patent application Ser. No. 11/234,372 filed Sep. 26, 2005 entitled Electronic System and Method for Employment Eligibility Verification and Reporting, the entire disclosure of which is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates in general to the field of computer systems for employee data tracking, and in particular to a computerized web-based method and system for verifying employment eligibility via the electronic completion of the Form I-9 by utilizing electronic signatures in connection with electronic Form I-9 processing and employment eligibility verification in compliance with regulations and statutes; a web based electronic I-9 auditing tool; and a unique document imaging interface that provides automated customer alerts relating to scanned and indexed I-9s. The invention provides employers with a paperless I-9 solution for both existing paper I-9s and electronic I-9s henceforth.

BACKGROUND OF THE INVENTION

When former President Reagan signed the landmark Immigration Reform and Control Act of 1986 (IRCA), it mandated that employers verify the "right to work" status of every newly hired employee within three days of employment. Specifically, it required employment eligibility verification through completion of the Form I-9. However, large numbers of employers are not in compliance with this law, and the risks for the employer who fails to fully comply with this law are significant. Whether the oversights are intentional, or unintentional, the consequences may be immediate and harsh, including large financial penalties imposed by the Department of Homeland Security (DHS) and disruption of the work environment by the untimely removal of unauthorized employees. Most employers are unaware that they have a problem with Form I-9 employment eligibility verification requirements until they are inspected by governmental authorities. By that time, it is generally too late to undo the damage.

The Systematic Alien Verification for Entitlements (SAVE) Program is run by the Bureau of U.S. Citizenship and Immigration Services (USCIS), under DHS, to administer programs that provide access to information contained in the Verification Information System (VIS) database. The VIS is a nationally accessible database of selected immigration status information.

The SAVE Program enables Federal, state, and local government agencies to obtain immigration status information that they need in order to determine an applicant's/recipient's eligibility for many public benefits. The SAVE Program also administers employment verification pilot programs that enable employers to verify the work authorization of their newly hired employees. In particular, the program allows employers to perform verification checks in the Social Security Administration (SSA) and DHS databases. Employers can use the SAVE Program's web-based access to verify the employment authorization of their newly hired employees. Access to the system is provided to an employer's Designated Agent upon execution of a Memorandum of Understanding and an Agency Agreement.

The events of 9/11 have further heightened the Federal Government's concern about the employment of unauthorized workers. Therefore, there is a substantial need for a system and method which assists Human Resources professionals with Form I-9 and employment eligibility compliance issues.

OBJECTS AND SUMMARY OF THE INVENTION

It is an object of the invention to provide an improved electronic system and method for employment eligibility verification. This employment eligibility verification program is termed "EVP".

It is a further object of the invention to provide an electronic signature solution that allows the electronic Form I-9 to be signed electronically with an electronic signature. In a preferred embodiment the electronic signature is compliant with the E-Sign Act and the DHS interim rule for electronic signature and storage of Form I-9, Employment Eligibility Verification, resulting in a "paperless" I-9 Form.

It is a further object of the invention to provide remote completion and signing of Section 1 of the Form I-9 by employees.

It is a further object of the invention to provide an electronic Form I-9 that is error detecting and allows employment eligibility verification through federal government programs directly from the electronic I-9 Form with one additional click of a button.

It is a further object of the invention to allow employers to add scanned documents to the electronic Form I-9. For example, some employers may elect to add scanned copies of employment eligibility documents (form List A, B, and/or C).

It is a further object of the invention to provide employers with a vehicle for uploading files of all scanned and indexed paper I-9s so that they can be viewed online and incorporate work authorization expiration notices, if applicable. For example, the employer can have all paper I-9s scanned into digital format and the file produced can be imported into the invention and logically associated with the system's rules for work authorization expiration and Form I-9 Section 3 updates and reverification.

It is a further object of the invention to provide a web-based electronic I-9 auditing tool that allows users to catalogue specific I-9 deficiencies and automatically generate recommended corrective action(s) and summary reports.

The system and method of the invention in one embodiment includes a third-party system accessible to a hiring organization which provides an electronic error-detecting Form I-9 with an E-Sign Act and DHS interim rule for electronic signature and storage of Form I-9, Employment Eligibility Verification compliant electronic signature and/or conducts electronic employment eligibility verification via the government's Basic Pilot Program.

The system in certain embodiments of the invention includes logic to prevent and/or identify technical errors on the electronic employment eligibility form (I-9) and security features that verify the authenticity of electronic signatures applied to the Form. In one embodiment, the invention is specifically designed for use with the Form I-9. Hooks may be provided to make the solution more generally available to a variety of companies with related business services. Enabling electronic signatures requires a software solution and the integration of such solutions on a minimum of two parties: The party providing electronic signature solutions and the party using the electronic signature solution; the software represents both parties and both systems in this embodiment of the invention. A secured data store may be provided for versioned documents, accuracy, tamper-proof records and creation and access history tracking.

BRIEF DESCRIPTION OF THE DRAWINGS

The foregoing and other objects, features, and advantages of the invention will be apparent from the following more particular description of preferred embodiments as illustrated in the accompanying drawings.

FIG. 2 shows a screen view illustrating an electronic employment eligibility form.

FIGS. 3 and 4 show screen views illustrating a short electronic EVP request form.

FIG. 5 shows a screen view illustrating a user interface for accessing pending electronic employment eligibility forms.

FIGS. 7-24 show screen views illustrating operation of a web interface in accordance with the invention in certain embodiments thereof.

FIGS. 25-34 show screen views illustrating operation of an interface for associating electronic signatures with an electronic form in accordance with the invention in certain embodiments thereof.

FIGS. 35-36 show screen views illustrating a user interface for accessing scanned I-9 Forms.

FIG. 39 shows a screen view illustrating the electronic audit form used by the auditor to evaluate each individual I-9 Form for compliance.

FIG. 40 shows a screen view of a sample flawed I-9 Form that highlights errors and is sent back to the hiring organization.

DETAILED DESCRIPTION OF THE PREFERRED EMBODIMENT

Figure 1:
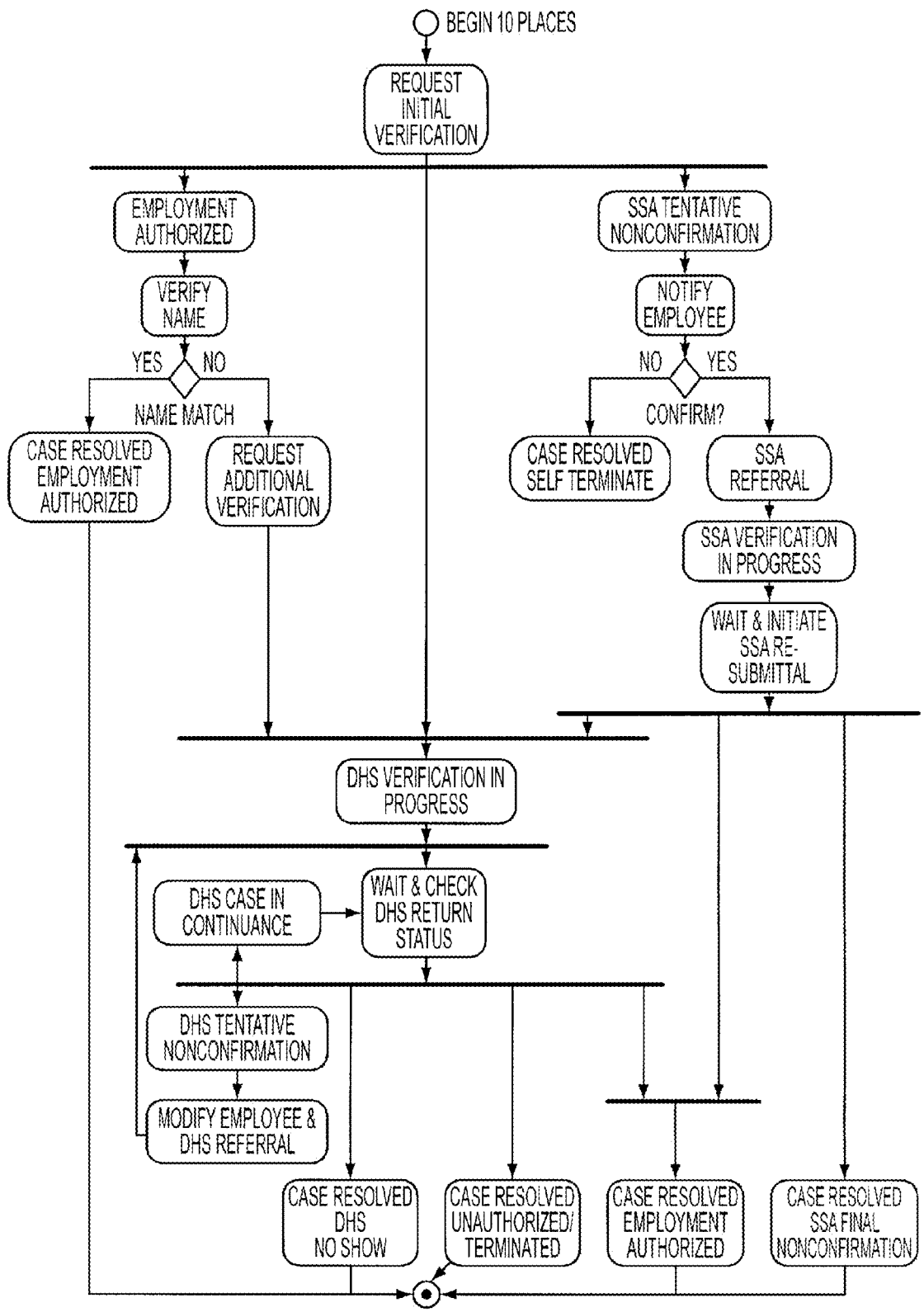
FIG. 1 shows a flow diagram illustrating an employment eligibility verification process according to an embodiment of the invention.

Reference will now be made in detail to the preferred embodiments of the present invention, examples of which are illustrated in the accompanying drawings. The present invention is described below with reference to block diagrams and operational illustrations of methods and devices to process immigration documents. It is understood that each block of the block diagrams or operational illustrations, and combinations of blocks in the block diagrams or operational illustrations, may be implemented by means of analog or digital hardware and computer program instructions. These computer program instructions may be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

The system and method of the invention in one embodiment provides a third-party system accessible to a hiring organization which provides an electronic error-detecting Form I-9 and/or conducts electronic employment eligibility verification. In the preferred embodiment, the system automatically processes work authorization documents and Social Security numbers through the use of a web-based system, and the results are reported back to the hiring organization. The preferred embodiment makes use of Web Services in order to enhance system stability, speed and capacity.

Using information contained on Form I-9 for a newly hired employee, the system electronically verifies the employee's right to work in the United States by comparing immigration and/or Social Security documents with information from SSA and DHS databases. The invention preferably validates the SSN and/or alien registration number of newly hired employees. The invention assists an employer's Human Resources executives with Form I-9 and IRCA compliance issues.

An appropriate database and server architecture can be used to carry out the invention. These include, e.g., a local SQL database, a Microsoft .NET platform, a web interface between clients and system administrators via HTML or XML forms, and middleware for receiving form data and querying the Federal databases. An SMTP interface may be provided for sending notifications to employers and/or receiving form data from employers.

The system is also preferably designed to allow for simplified integration with authorized resellers. Compared to simple B2B integrations, where only data is transmitted via XML or proprietary data definitions, Form I-9 Compliance B2B Integration (FCBI) accounts for integrating complex work flow processes that are specific to the services provided by the system of the invention. Examples of such complex work flow processes are:

High level of client and server side data validation.
Services requiring additional action(s).
  SSA Tentative Non-Confirmation:
    This Non-Confirmation status, returned by the SSA when no specific record match is found, requires the End-User to print out letters, request action from the employee (candidate) that received the above status and continue processing (immediately or at a later time).
  DHS Processing:
    This process is specific to DHS and requires initial processes that may last 1-3 days with follow up processes that might last up to 10 days. Each different status returned by DHS to the End-User leads to a different process.
Services to be completed at later times.
Notifications to be sent prior to document expiration dates or based on specific status changes.
Simply passing data back and forth would not properly support actions and work flows such as those mentioned above. For this reason, as well as to keep the integration overhead at a low cost and to help ensure completeness of integration in an efficient timeframe, the system in a preferred embodiment provides a portal-type integration that leaves the complex business rules and workflow processes on the system of the invention. Thus, only a minimum of data or request types are required by the End-User.

The B2B interface is a 'browser based' system, allowing parameters to be sent as a query string or as form posts which respond by showing different specialized portal-type screens that allow data entry, data processing, printing of notifications, in-progress and archived data retrieval. In addition, notification process servers allow the End-User to be notified regarding document expiration dates, changing status information on lengthy processes, etc. This notification process is separate and its options are initially set up per individual End-User.

Figure 2:
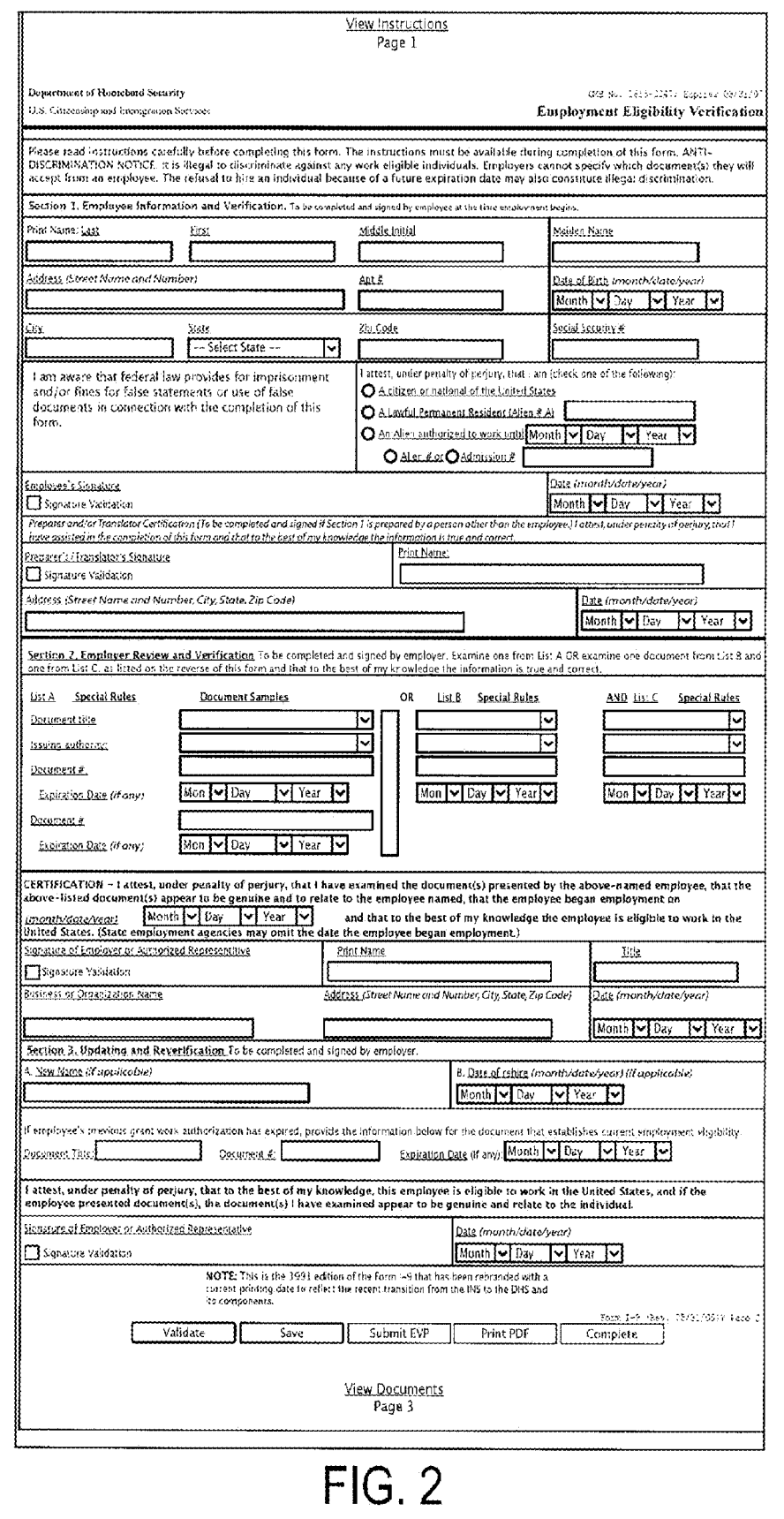

With reference to FIG. 1, a flow diagram illustrating an employment eligibility verification process according to an embodiment of the invention is shown. This process begins after an electronic Form I-9 (see FIG. 2) or the short EVP request form (see FIGS. 3 and 4) is completed and submitted. Both of these forms are processed through our error-detecting system in order to prevent and/or identify technical errors prior to submission. Examples of such errors include, e.g., incorrectly formatted Social Security numbers, use of document types from all three lists (List A, B, and C), using two documents from the same list, invalid hire date, etc. With reference to FIG. 1, once one of the above two forms is completed, the initial verification request is submitted. One of three responses is possible at this time: "Employment Authorized", "SSA Tentative Non Confirmation", and "DHS Verification in Progress". Each of these steps follows a unique process flow.

Figure 4:

With continued reference to FIG. 1, if the initial query results in employment authorization, the case is resolved as "Employment Authorized" and the unique verification number is recorded (see FIG. 4).

With continued reference to FIG. 1, if the query results in a SSA Tentative Non Confirmation status, employees by law must be given eight Federal Government workdays to contact the SSA to resolve their work authorization issues. The system of the invention provides a notice to employees and an SSA referral letter to be printed for and presented to the employee. If the employee chooses to "Not Contest" the tentative non confirmation, their employment will result in "Self Termination" and they will no longer be eligible to work for the employer. If the employee wishes to "Contest" the non confirmation, they must indicate so and contact an SSA office to provide them with a referral letter and attempt to resolve the issue. After eight Federal Government work days, the employer will conduct an SSA re-submittal and a final verification status will be issued. If the SSA still cannot confirm the employee's right to work in the U.S., the case will be resolved as "SSA Final Non Confirmation" and the employer will be instructed that employee is not authorized to work in the U.S. If the SSA is able to confirm the employee's right to work in the U.S., the case will be resolved as "Employment Authorized" and the unique verification number is recorded. During the period of time in which tentative non confirmation is being resolved, the employee should continue to work until the appropriate Federal authority makes a final determination.

With continued reference to FIG. 1, if the employee's information matches SSA records but the SSA does not have employment eligibility information for the non-citizen employee, the query is submitted to the DHS and the query will result in a DHS Verification in Progress status. DHS has three Federal Government work days to respond to this request (Fi9 will check for status updates four to five times per day during this time). If DHS cannot confirm verification within the three-day period, they may extend this time period and a "DHS Case in Continuance" status will appear. If DHS is able to confirm the employee's right to work in the U.S., an employment authorization status will be returned. The case will then be resolved as "Employment Authorized." If DHS cannot confirm employment eligibility, a "DHS Tentative Non Confirmation" status will be returned. At this time, the preferred embodiment of the system will prompt the employer to print a notice for the employee, explaining their options as well as provide for the printing of a DHS referral letter. If the employee chooses to "Not Contest" the tentative non confirmation, they do not need to go to a local DHS office, their employment will result in self termination and they will no longer be eligible to work for the employer as the query will be resolved as "DHS No Show." If the employee chooses to "Contest" the tentative non confirmation, they must indicate so and go to a DHS office with the DHS referral letter and attempt to resolve the issue. DHS will then provide the final verification notice within 8 Federal Government work days. If DHS still cannot confirm the employee's right to work in the U.S., the case will be resolved as "DHS Final Non Confirmation" and the employer will be instructed that the employee is not authorized to work in the U.S. If DHS is able to confirm the employee's right to work in the U.S., the case will be resolved as "Employment Authorized" and the verification number is recorded. During the period of time in which tentative non confirmation is being resolved, the employee should continue to work until the appropriate Federal authority makes a final determination.

Figure 5:
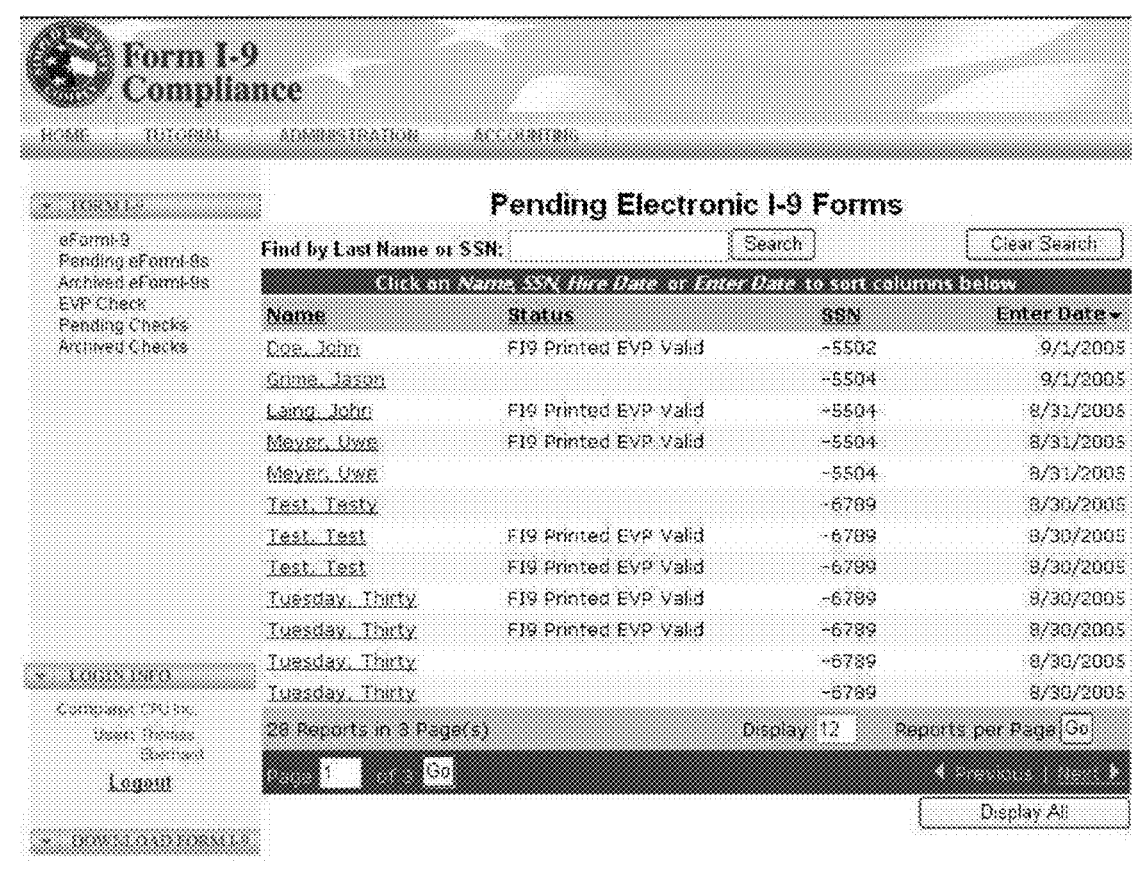
Figure 6:
FIG. 6 shows a screen view illustrating a user interface for accessing archived electronic employment eligibility forms.

With reference to FIG. 5 (Pending I-9 Forms) and FIG. 6 (Archived I-9 Forms), the system documents each case and provides reporting capabilities and an audit trail to assist the employer while maintaining the confidentiality of employee and employer data.

As illustrated in FIG. 6, the system and method of the invention preferably archives in its database electronic copies of work authorization records or documentation for groups of employees of a particular employer. The system provides employers with immediate web-based access to all files and may provide an expeditious means of outputting and delivering records or documentation for a group of employees upon a government audit of the employer. Delivery of such documents may be made to the employer and/or directly to the appropriate government agency.

FIGS. 7-24 show screen views illustrating operation of a web interface which allows a representative of an employer, using a browser, to enter and access employees' employment eligibility data, and to perform various functions in accordance with the invention as described above and below.

Figure 7:
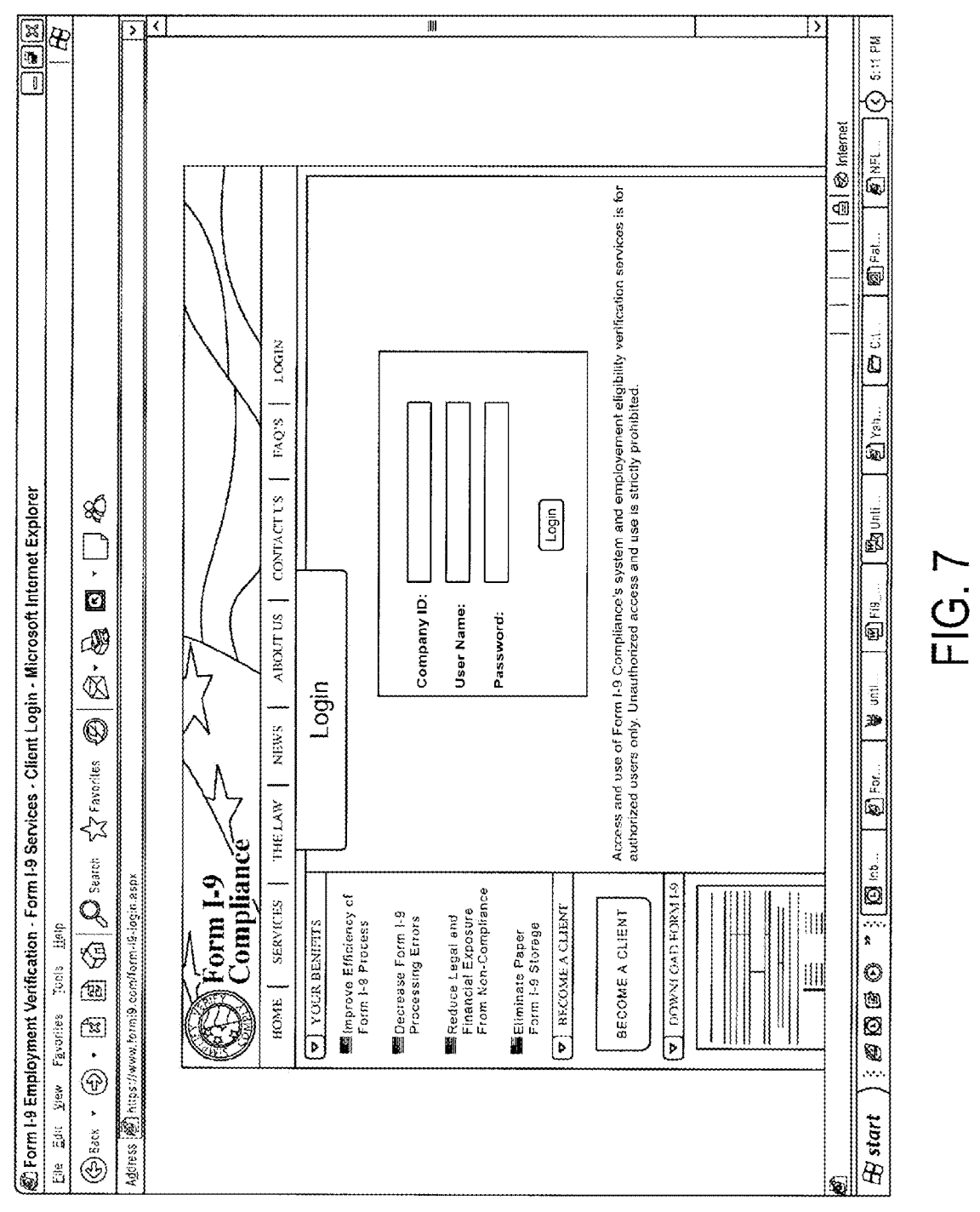

As shown in FIG. 7, the interface provides an initial login screen allowing the employer representative to enter a company ID, user name, and password to gain secure access to employees' employment eligibility information. Secure access may be provided via, e.g., HTTPS, Virtual Private Networking, or other appropriate protocol for secure network communications.

Figure 8:
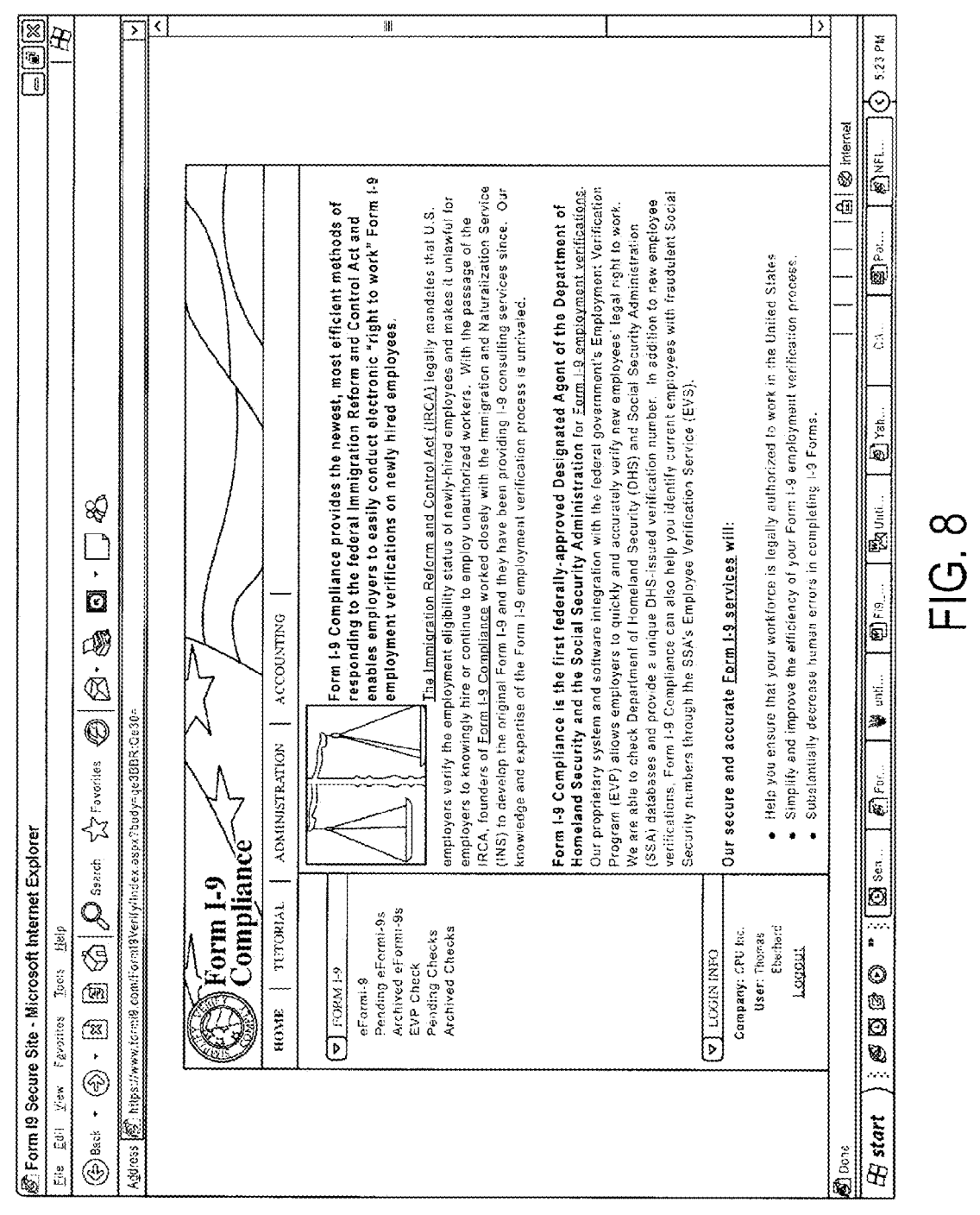

As shown in FIG. 8, the interface provides employers with a list of available services, e.g., electronic I-9 Form, EVP check, and pending and archived folders for both services.

Figure 9:
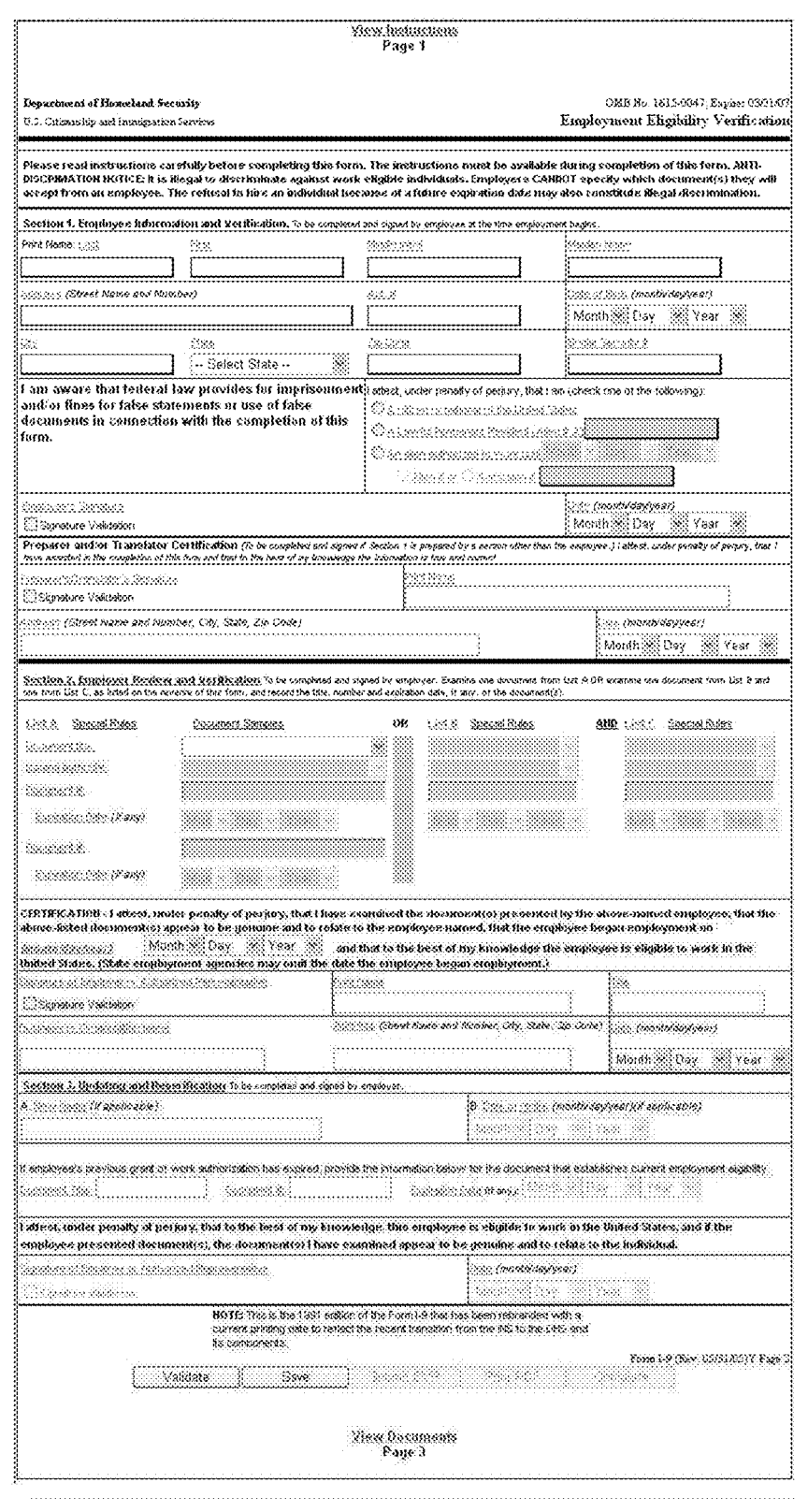

As shown in FIG. 9, the interface provides an electronic Form I-9. Employers may choose to complete only the I-9 employment eligibility information or they may also submit an EVP query directly from the I-9 Form.

Figure 10:
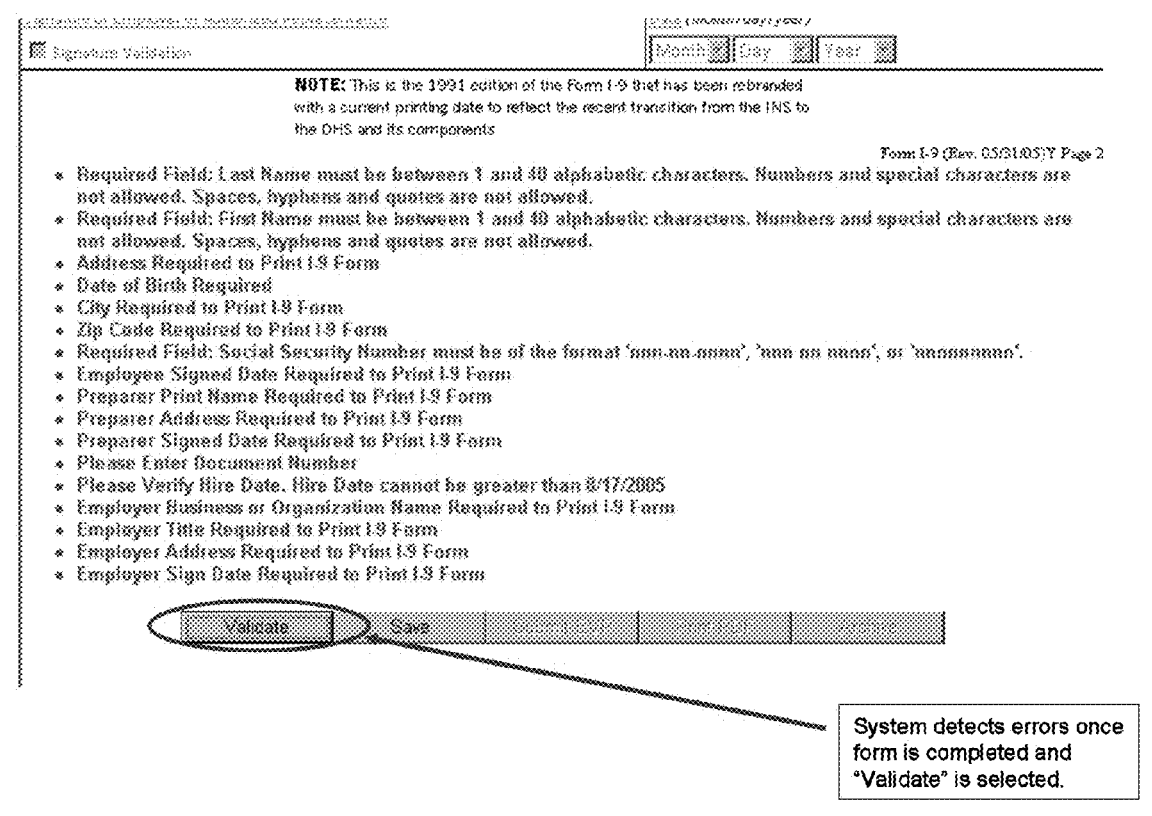

As shown in FIG. 10, the interface can detect errors in the online Form I-9 to help the employer correctly complete the form.

Figure 11:
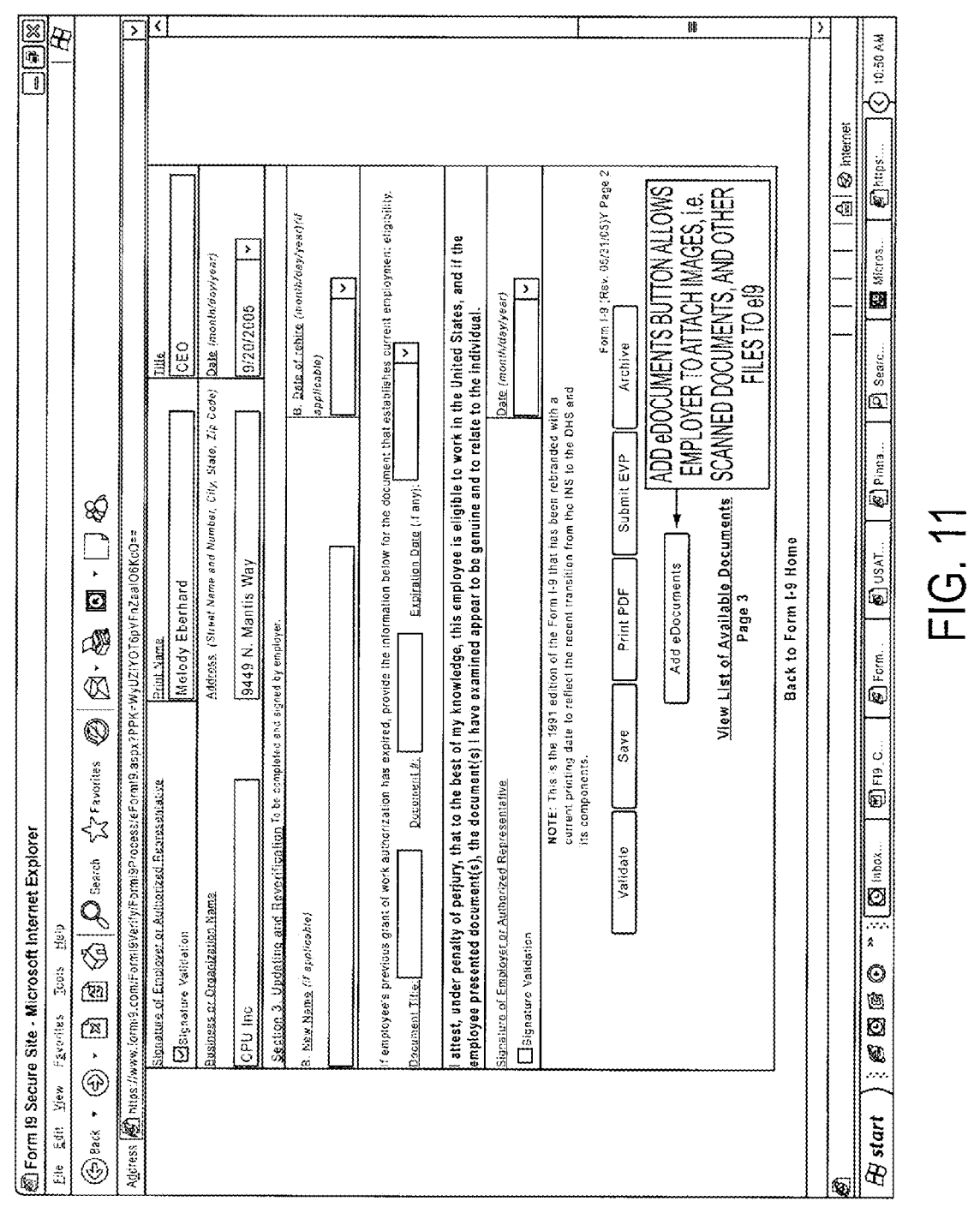

As shown in FIG. 11, the interface can allow employers to attach documents to an employee's electronic I-9 Form. Such documents may include, but are not limited to, scanned documents, PDF, MS Word, and other image files.

Figure 12:
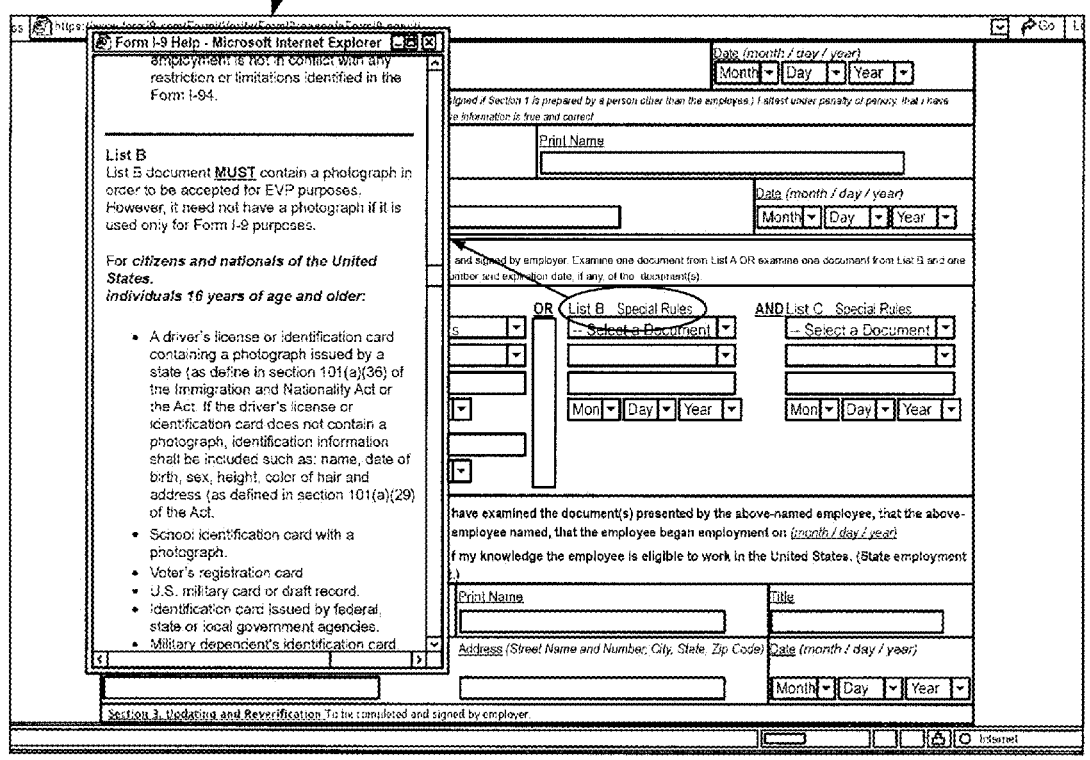

As shown in FIG. 12, the interface can provide detailed help, information, and hints for specific fields of the electronic I-9 Form and the EVP form.

As shown in FIGS. 13 and 14, the interface can allow "pending" forms to be saved, and may also allow completed forms to be archived. In embodiments in which such functionality is implemented, Employers have access to these forms via the Internet and can print them at any time.

Figure 15:
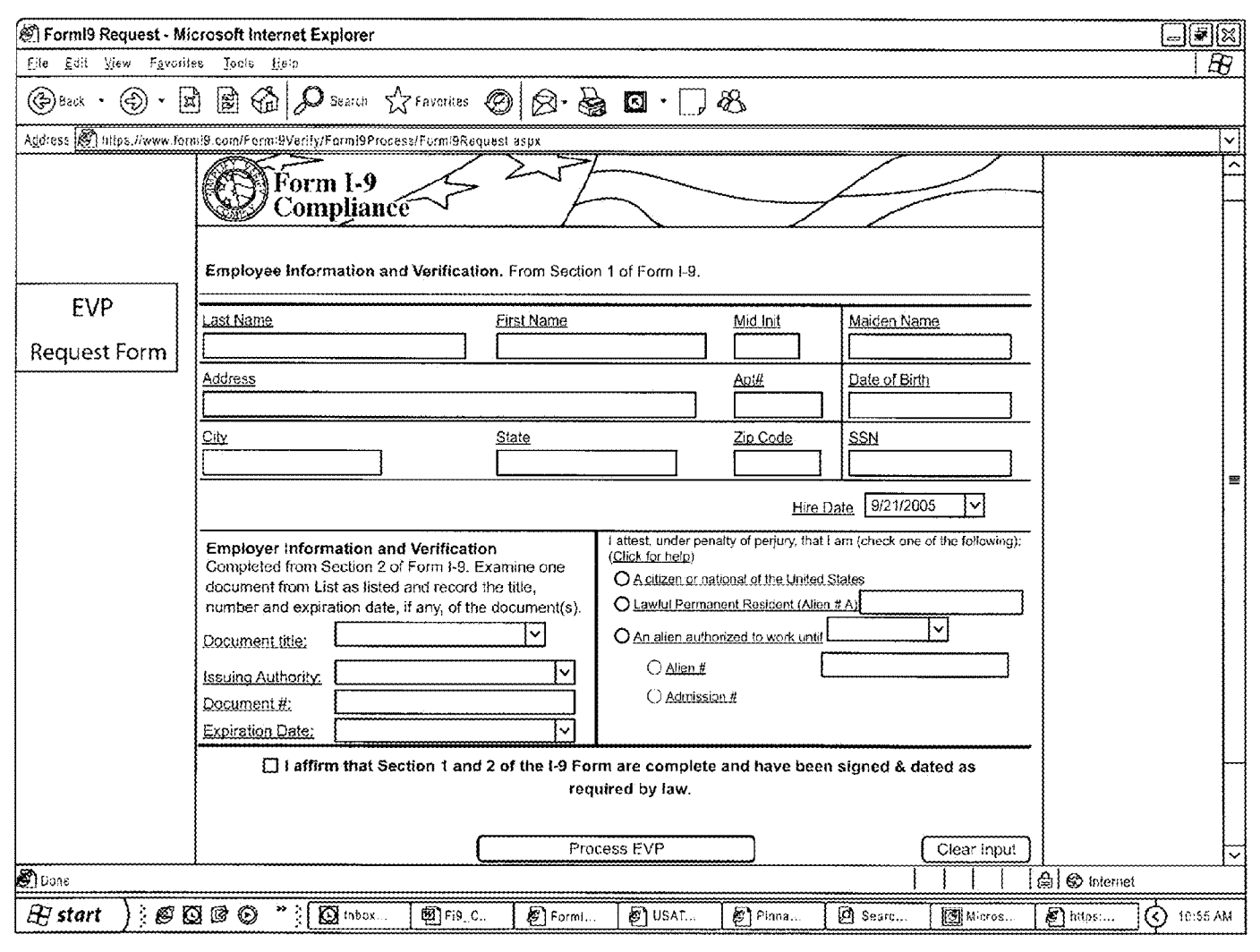

As shown in FIG. 15, the interface can provide a short electronic form for employment eligibility verification. This form can be used as a stand-alone verification request or in conjunction with the electronic Form I-9.

Figure 16:
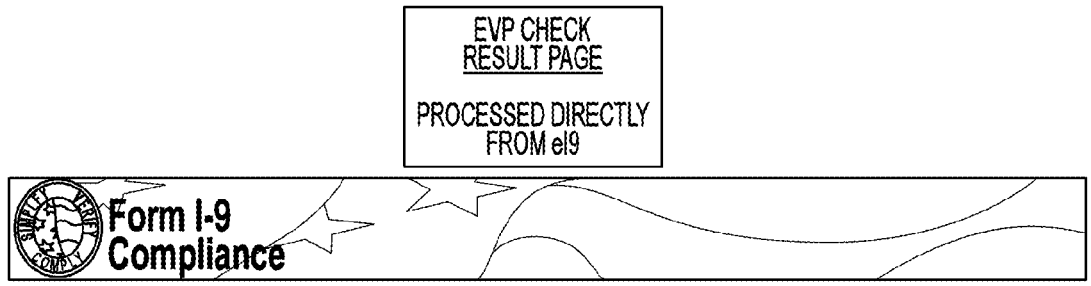
Figure 17:
Figure 18:
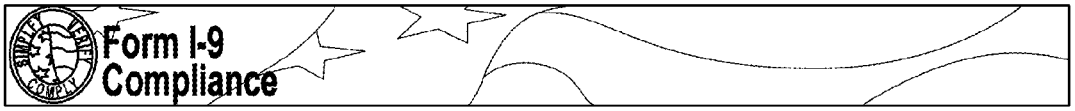
Figure 19:
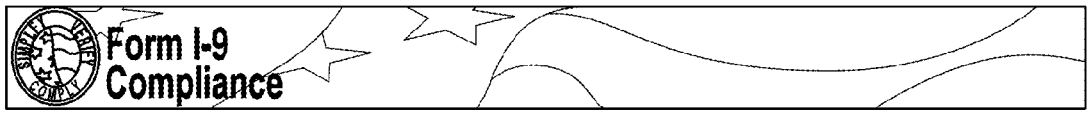
Figure 20:
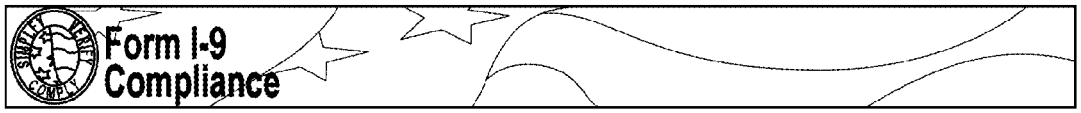
Figure 21:
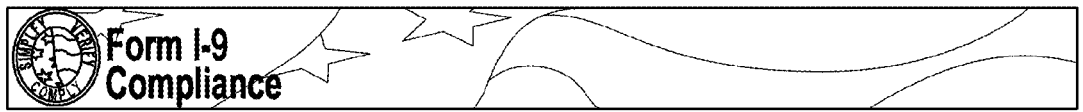
Figure 22:

As shown in FIG. 16, the interface can provide employers with employment eligibility verification request results; a resolution status, a government issued verification case number and a time stamp.

As shown in FIGS. 17-22, the interface can also provide exception handling in the employment eligibility verification process. Such exception handling may include, without limitation, determining when a tentative non-confirmation is issued, and facilitating resolution of each case by the employer. The invention can further provide for the printing of appropriate referral letters and the correction of submitted information.

Figure 23:
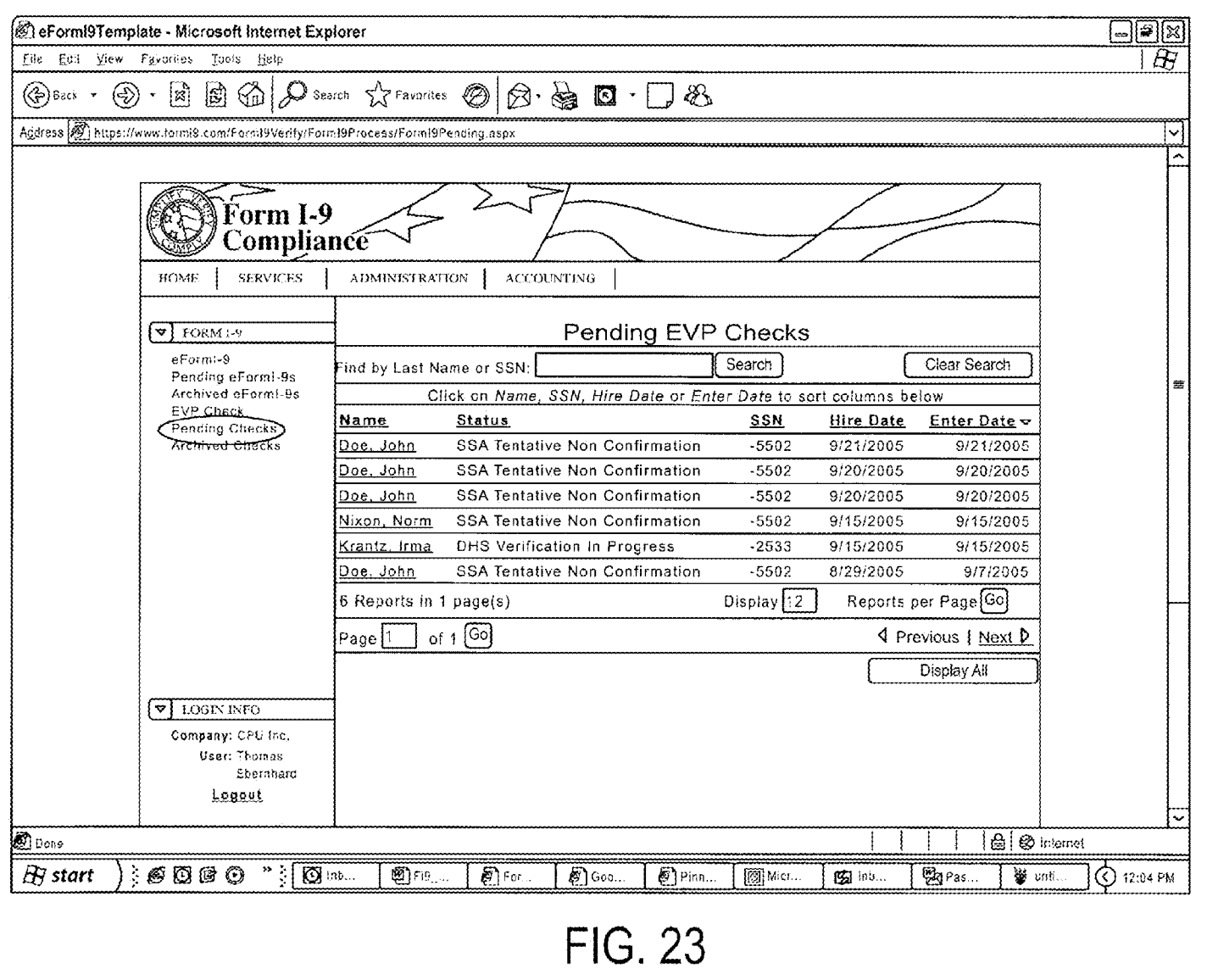
Figure 24:
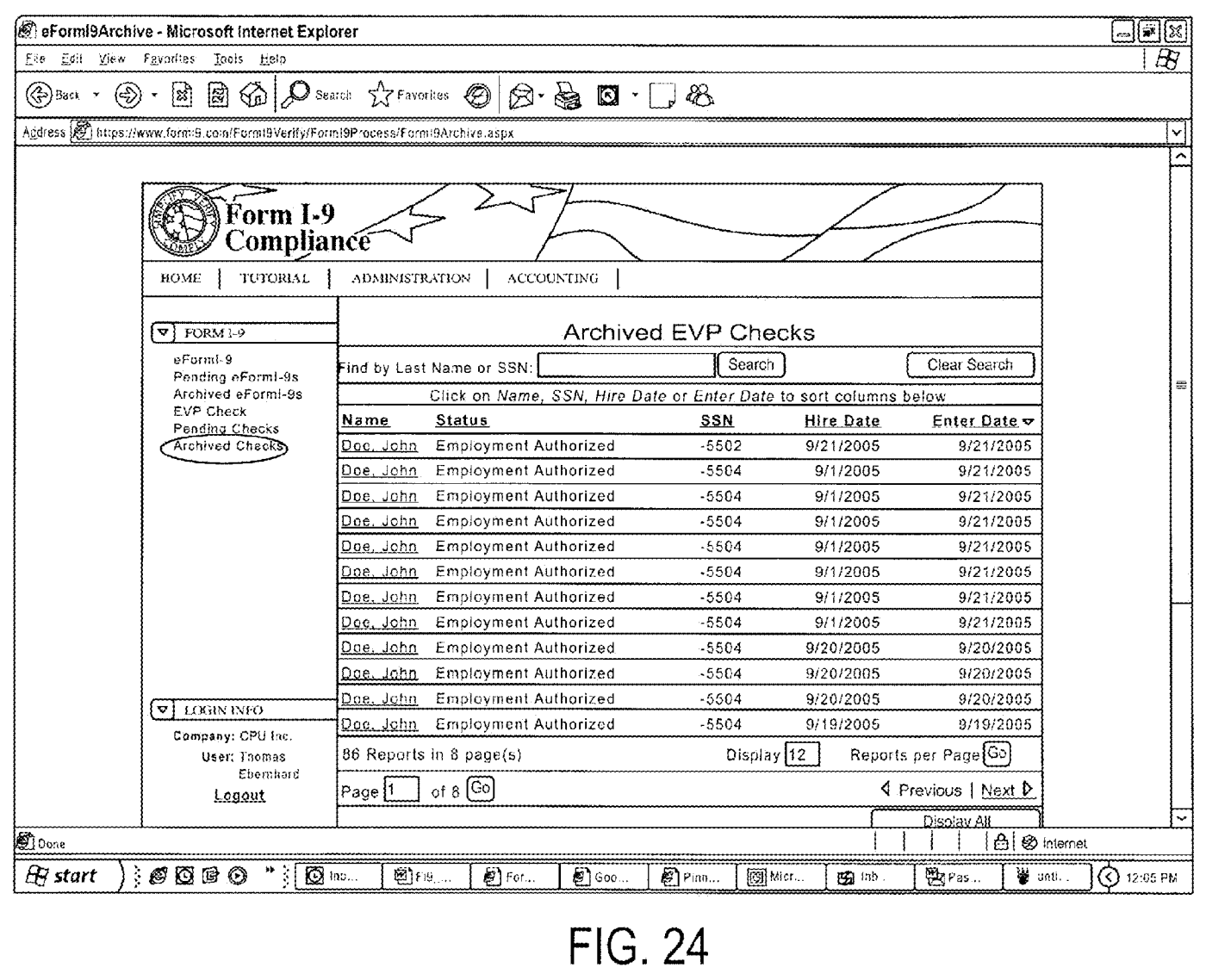

As shown in FIGS. 23-24, the interface can also provide for the saving of "pending" and "archived" employment eligibility verification requests.

FIGS. 25-34 illustrate a user interface for associating electronic signatures of employees, preparers/translators, and employers with an electronic Form I-9 record in connection with employment eligibility verification.

Figure 25:
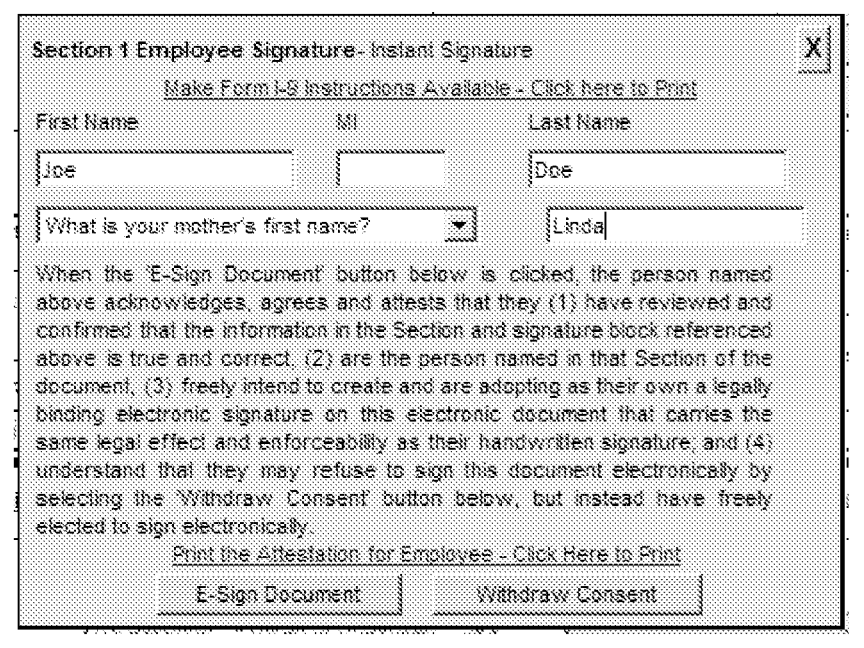

With reference to FIG. 25, an interface for receiving an employee's authorization for an electronic signature for Section 1 of an electronic Form I-9 is shown. This authorization interface may be displayed, e.g., in response to the employee selecting the "Signature Validation" checkbox in the "Employee's Signature" section of the electronic Form I-9. Other suitable triggering events include, e.g., moving the cursor or the focus to the "Employee's Signature" section of the electronic Form I-9, or selecting a button or hyperlink within the electronic Form I-9.

As can be seen in FIG. 25, the underlying form has been completed prior to display of the authorization interface. By selecting the "E-Sign Document" user interface element on the authorization interface, the employee is certifying that the information entered on the electronic Form I-9 is correct and is adopting the electronic signature as their own. A "Make Form I-9 Instructions Available" link is provided for compliance with the E-Sign Act. A "Withdraw Consent" user interface element is provided in the authorization interface to allow the employee to cancel their previous certification, that is, to "erase" a previous electronic signature.

Figure 26:
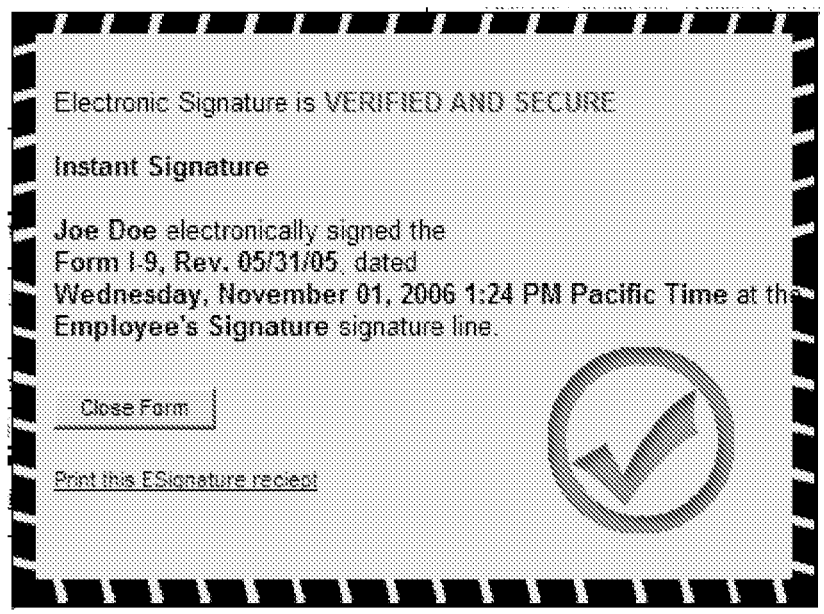

When the employee selects the "E-Sign Document" user interface element, the software hard-codes the signature to the electronic Form I-9. The software then utilizes a communications network to access a remote electronic signature server to request verification of the electronic signature. The electronic signature server creates a time stamp and verifies that the employee's electronic signature has been hard-coded to the electronic form. Data confirming the same is transmitted by the electronic signature server back to the computer running the electronic I-9 software, and an electronic signature authentication/receipt is displayed as shown in FIG. 26.

Both communications to and from the remote electronic signature server may be encrypted for high security and/or compliance with legal requirements. Once the authentication/receipt of FIG. 26 is displayed, the employee can select the "Close Form" user interface element to complete his or her interaction with the software.

Figure 27:
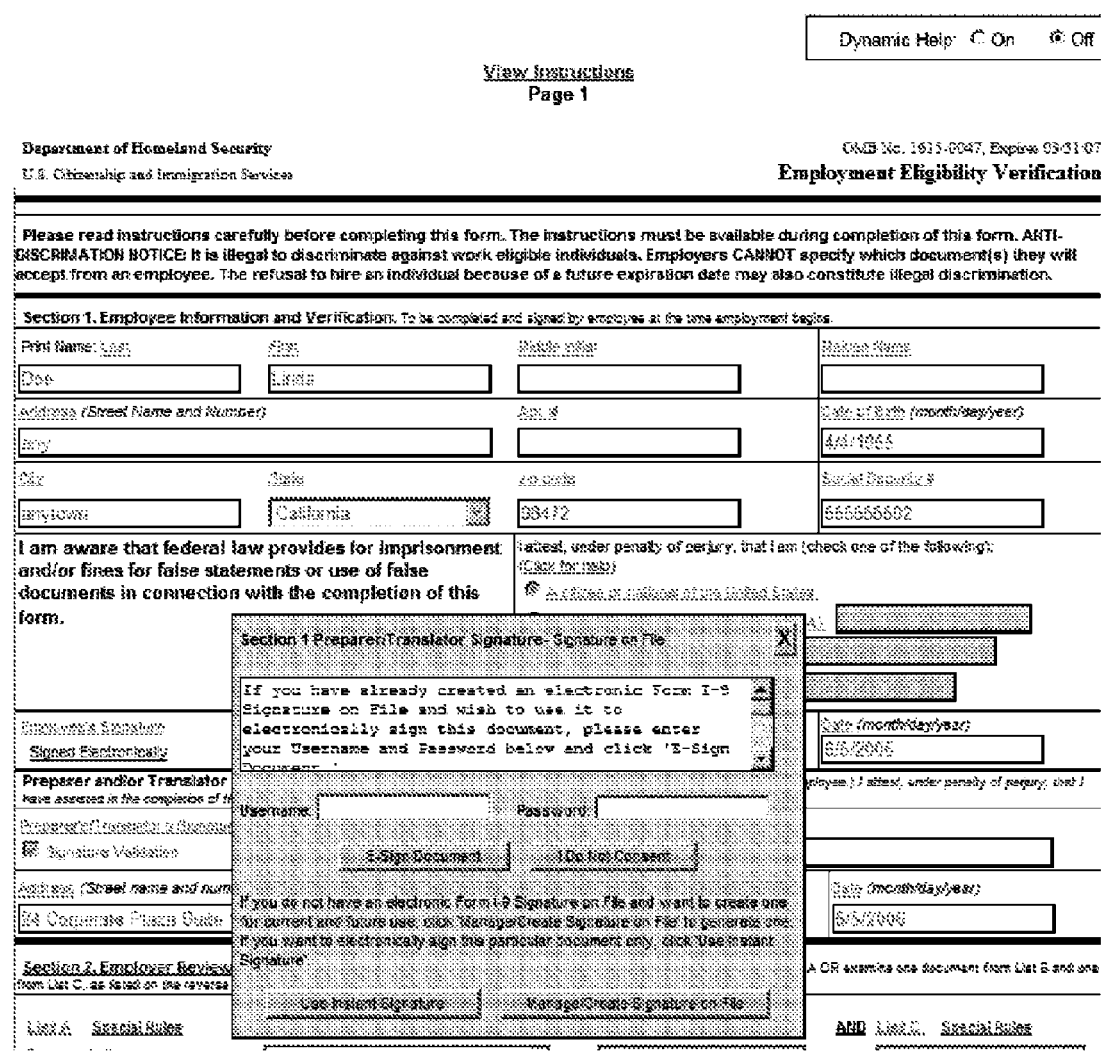

In addition to providing a means by which employees can electronically sign an electronic Form I-9 document, the present system further provides for receiving an electronic signature from a preparer or translator. FIG. 27 shows an interface for receiving a preparer's/translator's authorization for an electronic signature for Section 1 of an electronic Form I-9. The interface of FIG. 27 is displayed in response the preparer/translator selecting the "Signature Validation" checkbox shown in the "Preparer and/or Translator" section of the electronic form I-9.

The interface of FIG. 27 operates in much the same manner as that of FIG. 25, except that the certification made by the preparer/translator differs somewhat. In this case, by electronically signing the document the preparer/translator is certifying that (1) he or she is the person to whom the displayed Username and Password have been issued, (2) he or she intends to freely create their signature on the electronic document as a legally binding electronic signature that carries the same legal effect and enforceability as their handwritten signature, and (3) that he or she has assisted in the completion of the form and that, to the best of their knowledge, the information provided thereon is correct.

Figure 28:
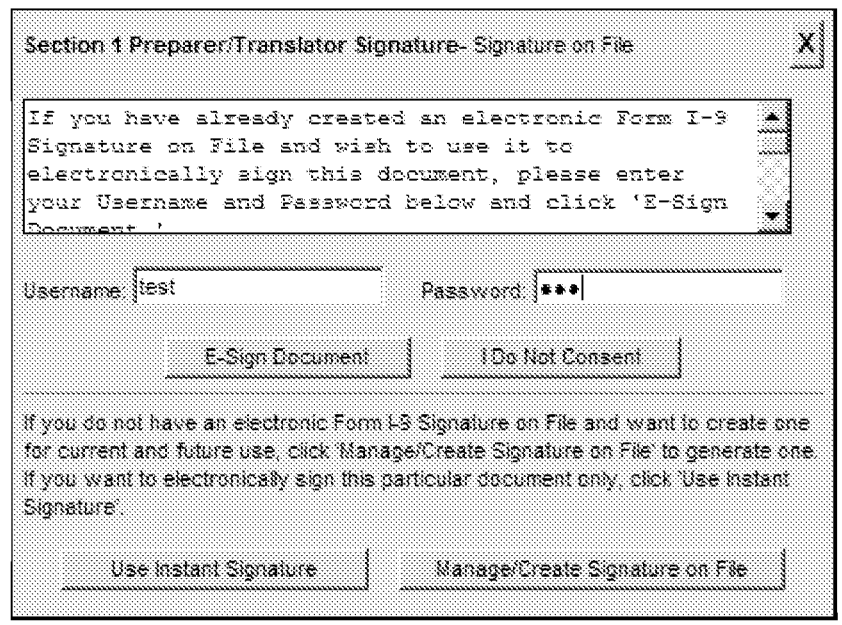
Figure 29:
Figure 31:
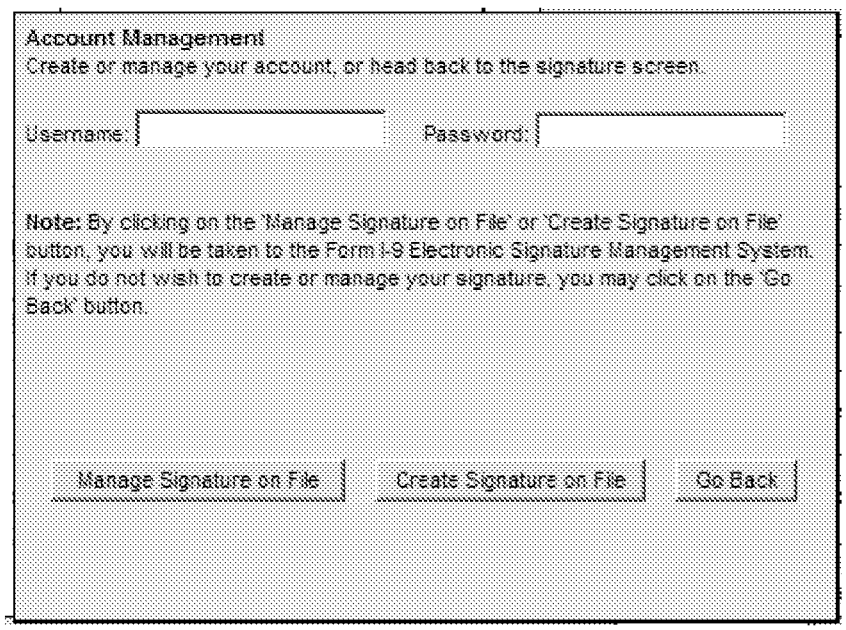

As illustrated in FIG. 28, the preparer or translator can enter a previously created username and password, and select "E-Sign Document" to electronically sign via communication with a remote electronic signature server in much the same manner as is discussed above with reference to FIGS. 25 and 26. As an alternative to entering a username and password, the preparer or translator can select "Use Instant Signature", and manually enter his relevant information, such as name, address, and the like. Once the document has been electronically signed, either by entry of a username and password or by using the Instant Signature method, and the signature has been verified via the remote electronic signature server, an electronic signature authentication/receipt is displayed as shown in FIG. 29.

Figure 30:
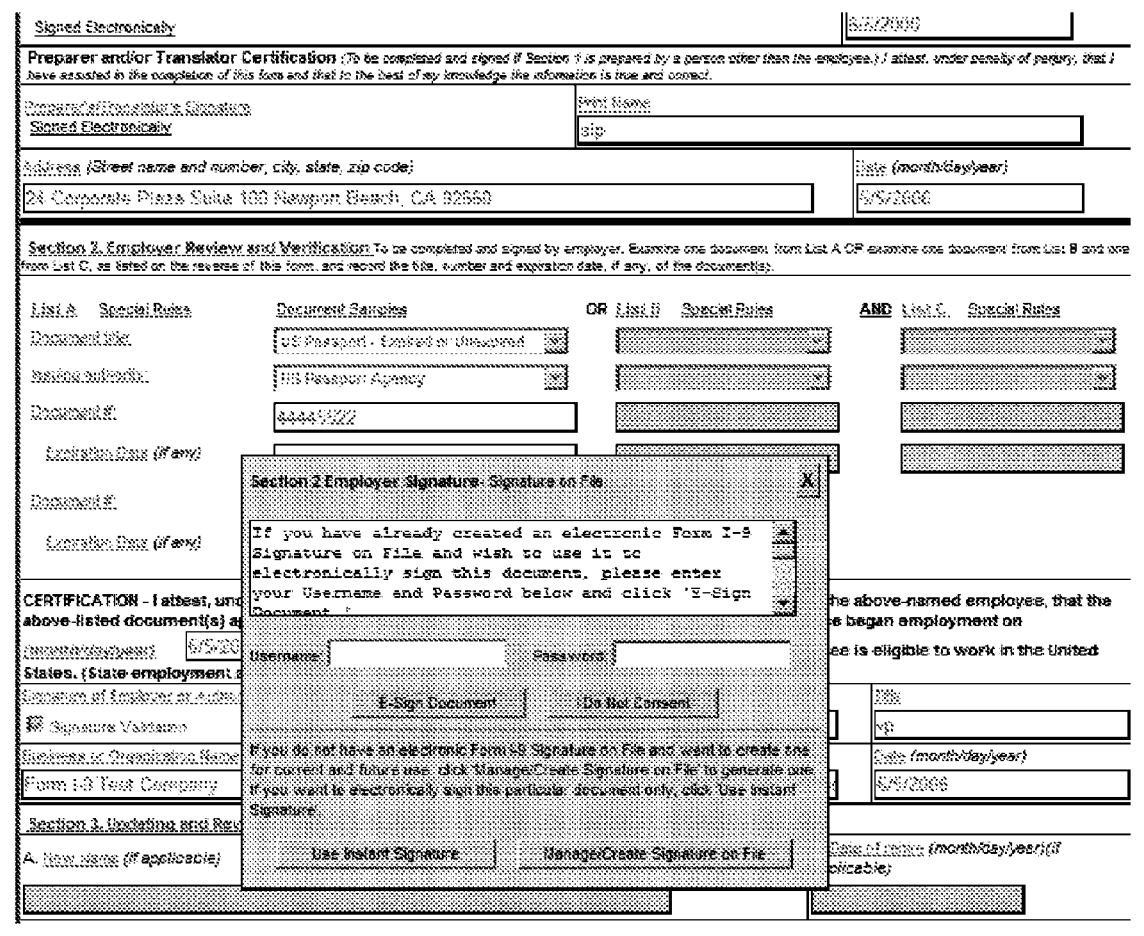

FIG. 30 further illustrates features of the present system which allow a user, typically a preparer or employer, to utilize an electronic signature that is "on file" for use in multiple employees' electronic I-9 forms rather than enter his personal information and/or execute a consent statement each time a new form is signed. A "Manage/Create Signature on File" interface element as shown in FIG. 30 causes the Account Management interface of FIG. 31 to appear. If the user has already set up an account, he can enter his previously assigned username and password on the form and select "Manage Signature on File" to change his personal information associated with the account. If the user has not yet set up an account, he can select "Create Signature on File." Doing so brings the user to a screen such as that shown in FIG. 32.

FIG. 32 illustrates an interface for creating a new user account. The same form of interface is preferably displayed when a user selects "Instant Signature" in the screen of FIG.

30. The user reads the legal consent statement, and enters a username, password, e-mail address, and other personal information to be associated with the account. To create an account, so that this step can be skipped or expedited when forms are electronically signed in the future, the user selects the "Make Signature on File available for current and future use . . . " checkbox. If this box is checked and the "I Consent" interface element is depressed, a confirmation screen as shown in FIG. 33 is displayed.

Figure 33:

Once the new user selects the "Verify and Save Your E-Signature on File" interface element shown in FIG. 33, their personal information is associated with the username and password that was entered and is transmitted to the remote electronic signature server for secure storage. In this manner, the user need only enter a username and password when electronically signing future documents, thereby significantly expediting the signing process, particularly for employer's representatives, preparers, or translators which regularly sign substantial numbers of the forms on a regular basis.

Figure 34:
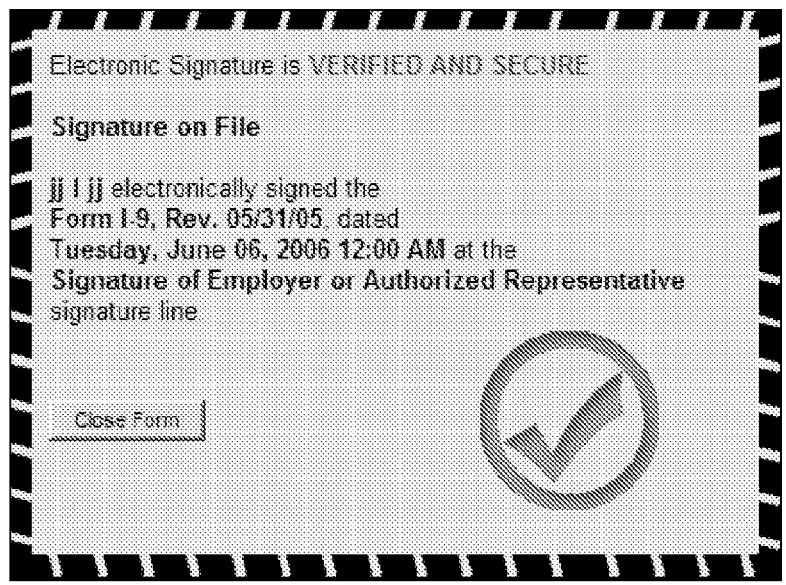

The remote electronic signature server creates the new account and transmits a confirmation of same back to the computer running the electronic Form I-9 software. In response, the software returns the user to the screen of FIG. 30, where the user can now enter the newly created username and password and select "E-Sign Document." The software then utilizes the communications network to again access the remote electronic signature server to request that it verify the signature. The remote electronic signature server creates a time stamp and verifies that the employee's electronic signature has been hard-coded to the electronic form. Data confirming the same is transmitted by the electronic signature server back to the computer running the electronic I-9 software, and an electronic signature authentication/receipt is displayed as shown in FIG. 34.

Figure 35:
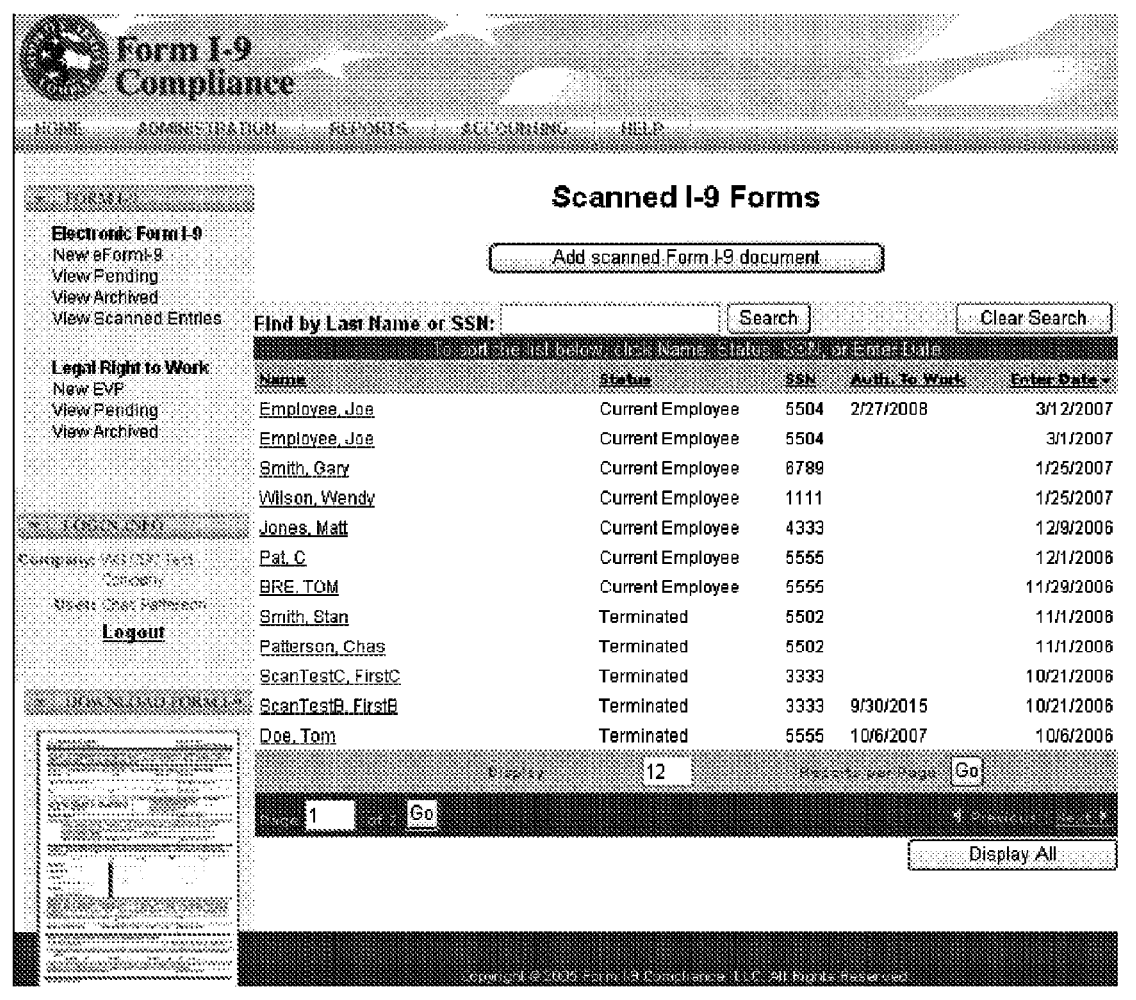
Figure 36:
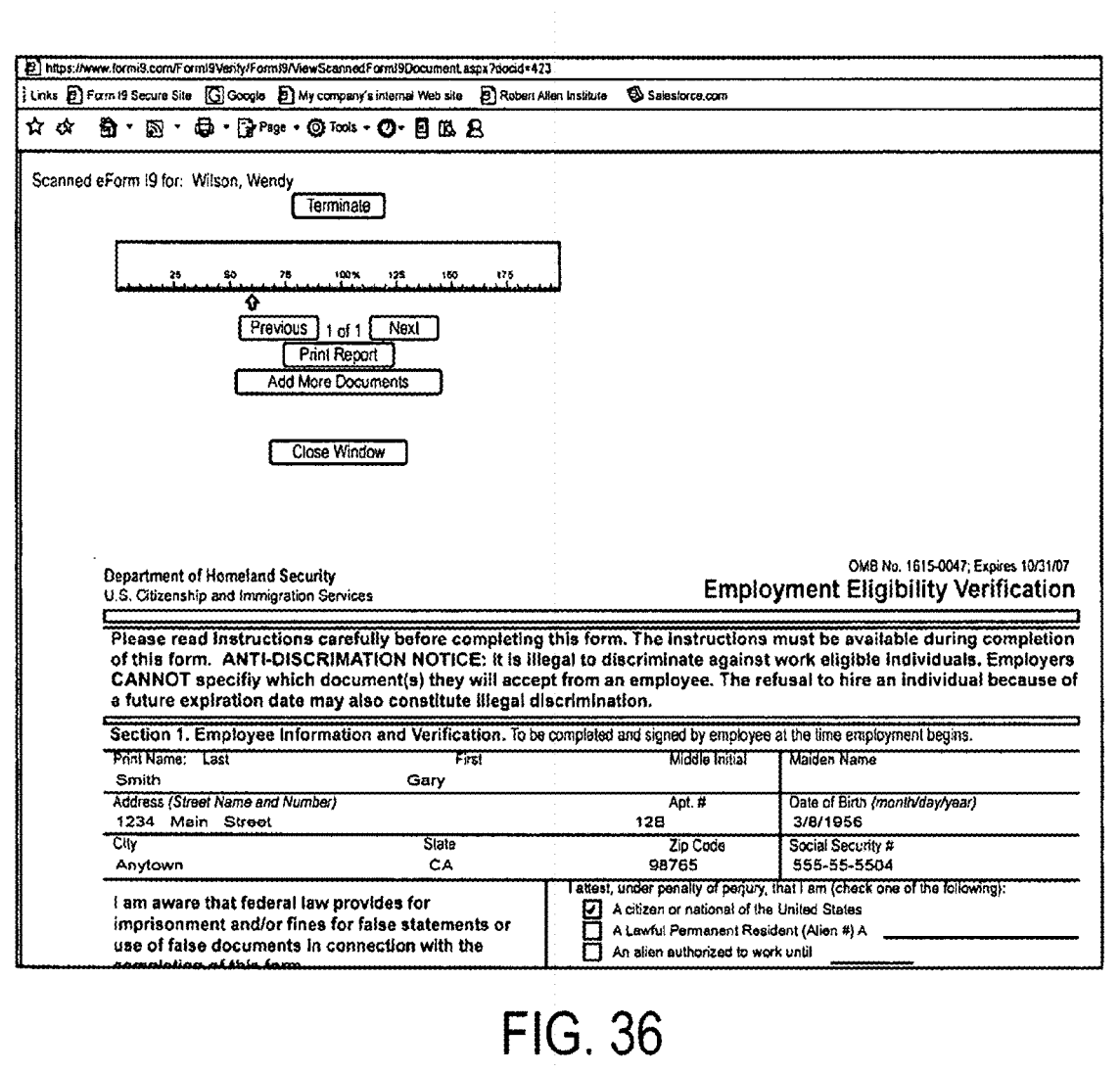

FIGS. 35-36 illustrate the interface for adding scanned images to the application. From the main page, the user will click on the "View Scanned Entries" link to view the documents currently uploaded to the application; shown in FIG. 35. Users can upload newly scanned images by clicking on the "Add Scanned Form I-9 Documents" button, or view previously scanned images by clicking on the employee name. FIG. 36 illustrates the web interface accessed by users to view scanned images. Users may re-position, re-size, or print the image. They may upload additional images by clicking on the "Add More Documents" button, or indicate that the employee has been terminated by clicking on the "Terminate" button and entering the termination date; the document will then be purged from the system according to federal regulations.

Figures 37, 38:
FIG. 37 shows a screen view illustrating a user interface that allows the employer to upload their payroll file and download audit reports.
FIG. 38 shows a screen view illustrating the I-9 auditor's interface, which allows the auditor to perform the various audit functions.
Figure 39:
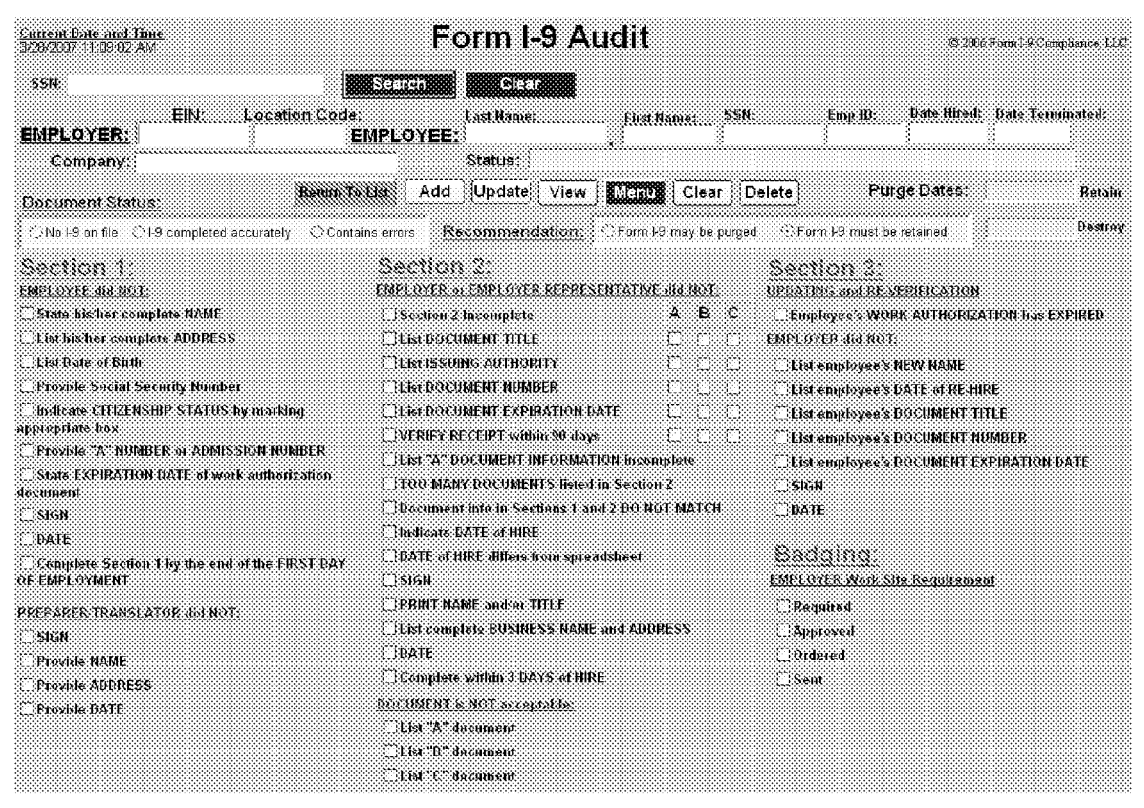
Figure 40:
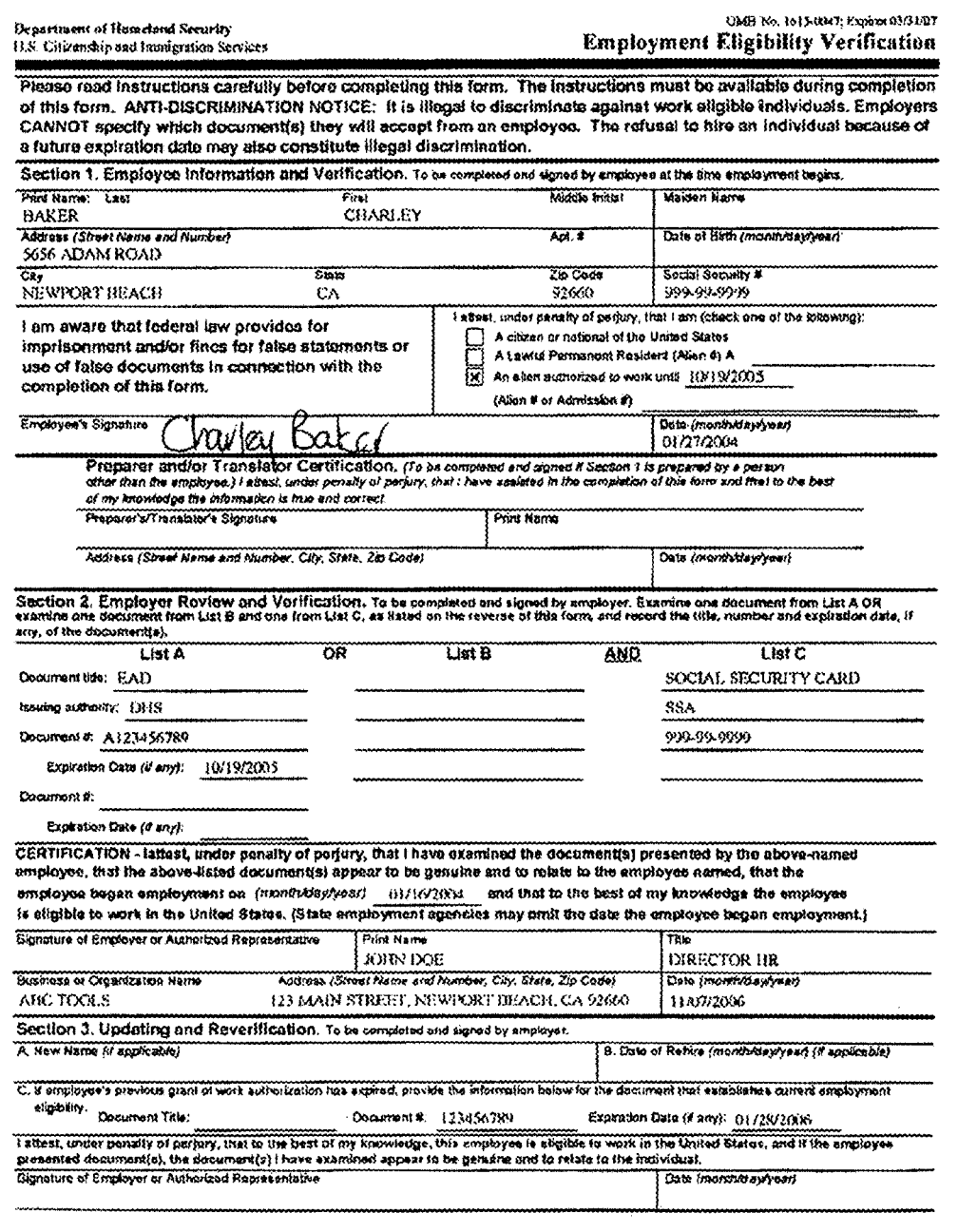
Figure 41:
FIGS. 41-42 show screen views of sample reports that are provided to the employer.
Figure 42:

FIGS. 37-42 illustrate the I-9 audit application. FIG. 37 illustrates the employer interface used to upload and download data from the invention. By clicking the "Browse" button, locating the employer's payroll file and clicking the "Upload my file" button, employers are able to upload their payroll files to the I-9 audit application. The auditor(s) will then retrieve and upload the employer data by clicking on the "Retrieve/Reformat Employer Data" and "Load Employer Data" buttons, respectively, as shown in FIG. 38. Upon upload of the employer payroll file, the auditor will utilize the electronic audit form shown in FIG. 39 to indicate errors, omissions, and retention periods of each paper I-9. The auditor will also physically highlight the flawed I-9 Forms as shown in FIG. 40 and send them back to the hiring organization for corrective action. Finally, recommendations for corrective action and summary reports are available for download by the hiring organization as shown in FIGS. 41 and 42.

The invention in its preferred embodiment further provides an automated tracking, notification, and reverification system for expiring work authorization documents. Compliance with Section 3 of Form I-9 requires reverification of employment eligibility upon expiration of a grant of work authorization. In particular, upon such event the employer must identify, by document title, document number and expiration date, the document which establishes current employment eligibility. The system and method of the invention in its preferred embodiment tracks the expiration date of work authorization documents provided to the employer by the employee. At a predetermined time interval (e.g., 90/60/30 days) prior to the expiration date of a particular employee's authorization documents, an expiration notification is generated by the system and transmitted to the employer. The system may then accept an electronic reverification from the employer and update the expiration date record for that employee accordingly. If no reverification information is received by the system prior to the actual expiration date, a second notification may be generated to advise the employer that the employee is no longer authorized to work. The invention in its preferred embodiment further provides automated tracking, notification, and reverification of scanned I-9 Forms. The system and method in its preferred embodiment uploads scanned I-9 Forms and provides automated work authorization document expiration alerts for same. The invention can further provide electronic I-9 audit results and summary reports which help illustrate an employer's level of employment eligibility compliance.

The system and method of the invention as hereinabove described can provide significant advantages over the prior art, including: confirmation of the employment eligibility of newly hired employees in a matter of seconds; virtually error-free I-9 Forms; improvements in the accuracy of wage and tax reporting to the Social Security Administration; reduction in an employer's legal exposure to government audits for mistakes related to the processing of Form I-9 and associated documents; provision of a paperless I-9 process; protection of United States jobs for those who have a right to work in the United States; significant reduction in the number of inquiries from the Social Security Administration involving unmatched Social Security accounts; protection of an employer's government contracts and subcontracts, if applicable; and, improvement in the stability and dependability of an employer's workforce. The system and method of the invention can further help reduce involuntary turnover of employees and can reduce processing errors. The invention further helps ensure against the negative effects resulting from the attendant loss of continuity and expertise in the Form I-9 processing that often occurs with Human Resources staff turnover.

The system and method of the invention as hereinabove described provides a safeguard against the use of counterfeit, invalid or expired immigration documents and Social Security numbers in the Form I-9 process, and thereby provides a more stable foundation for building a legal, credible and capable workforce.

While the invention has been particularly shown and described with reference to a preferred embodiment thereof, it will be understood by those skilled in the art that various changes in form and details may be made therein without departing from the spirit and scope of the invention.

What is claimed is:

1. A process for performing computerized employment authorization queries with a federal governmental entity, the process comprising:
provided a first database for storing a record for the person;
providing an electronic form having at least one variable to be entered;
storing the at least one variable in the record in the first database;
transmitting the at least one variable to a remote federal government system having a federal government database and employment eligibility information;
receiving an indication, from the remote federal government system, that the person corresponding to the at least one variable is legally eligible for employment, the indication based on:
the at least one variable sent to the remote federal government system determined to be valid by the remote federal government system; and
the at least one variable sent to the remote federal government system subsequently determined to indicate the person is authorized by the remote federal government for employment;
providing a first authorization interface for receiving the person's electronic signature, the first authorization interface comprising:
a first user interface element for obtaining the person's electronic signature; and
a second user interface element for enabling the person to withdraw a certified electronic signature previously entered by the person;
receiving data transmitted by a signature server, said data confirming verification by the signature server of the person's electronic signature;
displaying an electronic signature authentication receipt of said verification;
providing a second authorization interface for receiving a preparer's electronic signature, the second authorization interface comprising:
a first preparer interface element for obtaining the preparer's electronic signature via username and password;
a second preparer interface element for obtaining an electronic instant signature from the preparer; and
a third preparer interface element for calling an account management interface having a first account management interface element for creating an electronic signature account, and a second account management interface element for managing the electronic signature account;
providing a third authorization interface for receiving an employer's electronic signature, the third authorization interface comprising:
a first employer interface element for obtaining the employer's electronic signature via username and password;
a second employer interface element for obtaining an instant signature from the employer; and
a third employer interface element for calling the account management interface; and
determining an expiration date for legal eligibility for employment of the person based on at least some information stored in the record in the first database.

2. The process of claim 1 wherein the interface element is a button configured to cause the electronic form to be electronically signed.

3. The process of claim 1 wherein the at least one variable is an alien verification number.

4. The process of claim 1 wherein the person's electronic signature comprises an E-Sign Act and DHS interim rule for electronic signature and storage for a Form I-9 Employment Eligibility Verification compliant electronic signature.

5. The process of claim 1 further comprising transmitting a second indication that the person is legally eligible for employment based on the receipt of the indication from the system that the person corresponding to the at least one variable is legally eligible for employment.

6. The process of claim 5 further comprising a web-based interface programmed to allow a parameter to be sent as a query string or as a form post.

7. The process of claim 5 further comprising a web-based interface, wherein the second indication is transmitted via the web-based interface.

8. The process of claim 5 wherein the second indication is an automatically generated electronic mail message.

9. The process of claim 1 further comprising verifying the at least one variable of the electronic form is validly entered.

10. The process of claim 9 wherein the verifying the at least one variable of the electronic form is validly entered comprises preventing technical errors while the at least one variable of the electronic form is being entered.

11. The process of claim 9 wherein the verifying the at least one variable of the electronic form is validly entered comprises identifying technical errors while the at least one variable of the electronic form is being entered.

12. The process of claim 1 further comprising providing a web-based interface, wherein the electronic form having at least one variable to be entered is accessed via the web-based interface.

13. The process of claim 1 further comprising:
receiving payroll information for the person; and
automatically verifying and formatting the payroll information to comply with government technical specifications.

14. The process of claim 1 further comprising:
receiving an image file of a document; and
associating the image file of the document with a record for a person stored in the first database.

15. The process of claim 14 further comprising:
receiving a batch upload of multiple image files; and
associating each of the multiple image files with one or more records for persons stored in the first database.

16. The process of claim 1 further comprising:
receiving an uploaded payroll file;
auditing the electronic form;
storing results based upon the auditing of the electronic form;
generating a report for the based upon the auditing of the electronic form;
generating a recommendation based upon the auditing of the electronic form; and
transmitting the report and the recommendation.

17. A system for performing computerized employment authorization queries with a federal governmental entity, the system comprising:
an electronic form having at least one variable to be entered by a user, the electronic form configured to verify valid entry of the at least one variable by the user;
a first database for storing of a record for the person, the first database configured to store the at least one variable in the record for the person; and a processor configured to:
  transmit the at least one variable to a remote federal government system containing employment eligibility information,
  receive an indication, from the remote federal government system, that the person corresponding to the at least one variable is legally eligible for employment, the indication being based on:
    the at least one variable determined to be valid by the remote federal government system, and
    the at least one variable subsequently being determined to indicate that the person is authorized by the remote federal government system for employment,
  provide a first authorization interface for receiving the person's electronic signature, the first authorization interface comprising:
    a first user interface element for obtaining the person's electronic signature; and
    a second user interface element for enabling the person to withdraw a certified electronic signature previously entered by the person;
  provide a second authorization interface for receiving a preparer's electronic signature, the second authorization interface comprising:
    a first preparer interface element for obtaining the preparer's electronic signature via username and password;
    a second preparer interface element for obtaining an electronic instant signature from the preparer; and
    a third preparer interface element for calling an account management interface having a first account management interface element for creating an electronic signature account, and a second account management interface element for managing the electronic signature account;
  provide a third authorization interface for receiving an employer's electronic signature, the third authorization interface comprising:
    a first employer interface element for obtaining the employer's electronic signature via username and password;
    a second employer interface element for obtaining an instant signature from the employer; and
    a third employer interface element for calling the account management interface; and
  determine an expiration date for legal eligibility for employment of the person.

18. A process for providing processing of an immigration form, comprising:
  displaying a first screen having a fillable field for receiving immigration information;
  displaying, after receipt of the immigration information via the first screen, a first authorization interface for receiving a person's electronic signature, the first authorization interface comprising:
    a first user interface element for obtaining the person's electronic signature; and
    a second user interface element for enabling the person to withdraw a certified electronic signature previously entered by the person;
  displaying a second authorization interface for receiving an employer's electronic signature, the second authorization interface comprising:
    a first employer interface element for obtaining the employer's electronic signature via username and password;
    a second employer interface element for obtaining an electronic instant signature from the employer; and
    a third employer interface element for calling an account management interface having a first account management interface element for creating an electronic signature account, and a second account management interface element for managing the electronic signature account;
  marking a file as electronically signed based upon an interaction with one of the first user interface element, the first employer interface element, or the second employer interface element;
  receiving a notification of whether the person is eligible for employment based upon the immigration information, the notification based on the immigration information being both valid and the immigration information determined to indicate authorization for employment of the person;
  determining an expiration date for a grant of work authorization for the person; and
  updating the expiration date for the grant of work authorized based upon receipt of a reverification document.

19. The process of claim 18 further comprising displaying an interface configured to allow association of an attached document with the file.

20. The process of claim 19 wherein the attached document is a scanned image.

21. The process of claim 18 wherein the first user interface element comprises a button associated with a label indicating that interaction with the button will cause an electronic immigration form to be signed.

22. The process of claim 18 further comprising storing user consent information for use in a plurality of electronic immigration forms, wherein a consent statement need not be executed each time one of the plurality of electronic immigration forms is processed.

23. The system of claim 18 wherein determining the expiration date is based on information entered by a user to the electronic form.

24. The system of claim 17 wherein the expiration date for legal eligibility for employment of the person is based on at least some information stored in the record of the first database.

25. A process for performing computerized employment authorization queries with a federal governmental entity, the process comprising:
  providing a first databased for storing a record for the person;
  providing an electronic form having at least one variable to be entered;
  storing the at least one variable in the record in the first database;
  determining the at least one variable is valid;
  transmitting the at least one variable to a remote federal government system having employment eligibility information;
  receiving an indication, from the remote federal government system, that the person corresponding to the at least one variable is legally eligible for employment, the indication based on the at least one variable sent to the system determined to indicate the person is authorized by the remote federal government system for employment;
  providing a first authorization interface for receiving the person's electronic signature, the first authorization interface comprising:

a first user interface element for obtaining the person's electronic signature; and a second user interface element for enabling the person to withdraw a certified electronic signature previously entered by the person;

receiving data transmitted by a signature server, said data confirming verification by the signature server of the person's electronic signature;

providing a second authorization interface for receiving a preparer's electronic signature, the second authorization interface comprising:

a first preparer interface element for obtaining the preparer's electronic signature via username and password;

a second preparer interface element for obtaining an electronic instant signature from the preparer; and a third preparer interface element for calling an account management interface having a first account management interface element for creating an electronic signature account, and a second account management interface element for managing the electronic signature account;

providing a third authorization interface for receiving an employer's electronic signature, the third authorization interface comprising:

a first employer interface element for obtaining the employer's electronic signature via username and password;

a second employer interface element for obtaining an instant signature from the employer; and a third employer interface element for calling the account management interface; and determining an expiration date for legal eligibility for employment of the person based on at least some information stored in the record of the first database.

* * * * *